(12) United States Patent
Mech et al.

(10) Patent No.: US 8,457,405 B2
(45) Date of Patent: Jun. 4, 2013

(54) EXAMPLE-BASED PROCEDURAL SYNTHESIS OF ELEMENT ARRANGEMENTS

(75) Inventors: Radomir Mech, Mountain View, CA (US); Takashi Ijiri, Kawasaki (JP); Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1253 days.

(21) Appl. No.: 12/039,164

(22) Filed: Feb. 28, 2008

(65) Prior Publication Data

US 2009/0058871 A1    Mar. 5, 2009

Related U.S. Application Data

(60) Provisional application No. 60/969,508, filed on Aug. 31, 2007.

(51) Int. Cl.
*G06K 9/00*        (2006.01)

(52) U.S. Cl.
USPC .......................................................... 382/181

(58) Field of Classification Search
USPC .................. 382/100, 181, 223, 254, 308, 325
See application file for complete search history.

(56) References Cited

U.S. PATENT DOCUMENTS

| | | |
|---|---|---|
| 6,762,769 B2 | 7/2004 | Guo et al. |
| 6,919,903 B2 | 7/2005 | Freeman et al. |
| 6,937,275 B2 | 8/2005 | Heiles |
| 6,964,025 B2 | 11/2005 | Angiulo et al. |
| 6,987,535 B1 | 1/2006 | Matsugu et al. |
| 7,012,624 B2 | 3/2006 | Zhu et al. |
| 7,069,506 B2 | 6/2006 | Rosenholtz et al. |
| 7,136,072 B2 | 11/2006 | Ritter |
| 7,239,314 B2 | 7/2007 | Johnston |
| 7,257,261 B2 | 8/2007 | Suh |
| 7,283,140 B2 | 10/2007 | Zhou et al. |
| 7,418,673 B2 | 8/2008 | Oh |
| 7,577,313 B1 | 8/2009 | Georgiev |
| 7,596,751 B2 | 9/2009 | Rowson et al. |
| 7,800,627 B2* | 9/2010 | Zhou et al. ................... 345/582 |
| 8,249,365 B1 | 8/2012 | Winnemoeller et al. |
| 8,280,703 B1 | 10/2012 | Mech |

(Continued)

OTHER PUBLICATIONS

Barla P., Breslav S., Thollot J., Sillion F., Markosian L.: Stroke Pattern Analysis and Synthesis. Computer Graphics Forum, 25 (3), pp. 663-671, 2006.

(Continued)

*Primary Examiner* — Edward Park
(74) *Attorney, Agent, or Firm* — Wolfe-SBMC

(57) ABSTRACT

Method and apparatus for synthesizing element arrangements from an example. Embodiments may synthesize element arrangement patterns from an example arrangement. Embodiments may combine a texture synthesis technique based on local neighborhood comparison of an example and a target with procedural modeling based on local growth. Given an example, connectivity of elements may be constructed to get neighborhoods information of each element. A synthesis process may start with a single seed and expand the synthesized pattern by placing new elements at seed locations one by one. A reference element may be selected from the example that has neighborhood features that are most similar to neighborhood features of the target seed in the synthesized pattern. A non-rotation mode, a rotation mode, and a flow field mode may be provided. A painting tool, a flow field tool, and a boundary tool may be provided.

31 Claims, 19 Drawing Sheets

U.S. PATENT DOCUMENTS

2004/0164996 A1* 8/2004 Criminisi et al. ............. 345/619
2006/0267958 A1 11/2006 Kolmykov-Zotov et al.
2006/0285762 A1* 12/2006 Sun et al. ...................... 382/254

OTHER PUBLICATIONS

Muller M., Heidelberger B., Teschner M., Gross M.: Meshless deformations based on shape matching. ACM Transactions on Computer Graphics, 24, 3 (2005), 471-478.
Měch R., Prusinkiewicz P.: Visual models of plants interacting with their environment. In Proceedings of ACM SIGGRH 1996, 397-410.
Prusinkiewicz P., James M., Měch R.: Synthetic topiary. In Proceedings of ACM SIGGRAPH 1994, 351-358.
Wong M. T., Zongker D. E., Salesin D. H.: Computer-generated floral ornament. In Proceedings of SIGGRAPH 1998, 423-434.
Parish Y. I. H., Muller P.: Procedural modeling of cities. In Proceedings of ACM SIGGRAPH 2001, 301-308.
Wonka P., Wmmer M., Sillion F., Ribarsky W.: Instant architecture. ACM Trans. Graph., 22 (2003), 3, 669-677.
Muller P., Wonka, P., Haegler, S., Ulmer, A., Gool, L. V.: Procedural modeling of buildings. ACM Trans. Graph., 25(2006) 3, 614-623.
Deussen O. and Lintermann, B.: Interactive Modeling of Plants. IEEE Computer Graphics and Applications, 19 (1999), 1, 56-65.
Esch G., Wonka P., Müller P., Zhang E.: Interactive procedural street modeling, SIGGRAPH 2007 Sketches.
Ijiri T., Owada S., Igarashi T.: The sketch L-System: global control of tree modeling using free-form strokes. In Proceedings of 6th International Symposium SmartGraphics 2006, 138-146.
Heeger, D. J., Bergen, J. R.: Pyramid-based texture analysis and synthesis. In Proceedings of SIGGRAPH 1995, 229-238.
Efros A. A., Leung T. K.: Texture synthesis by nonparametric sampling. In IEEE Int. Conf. on Computer Vision (1999), pp. 1033-1038.
Wei L-Y., Levoy M.: Fast Texture Synthesis using Tree-structured Vector Quantization. In Proceedings of Siggraph 2000, 479-488.
Turk G.: Texture Synthesis on Surfaces. In Proceedings of Siggraph 2001, 347-354.
Ashikhmin, M.: Synthesizing Natural Textures. In Proceedings of the Symposium on Interactive 3D Graphics 2001, 217-226.
Hertzmann, A., Jacobs, C. E., Oliver, N., Curless, B., Salesin, D. H.: Image Analogies. In Proceedings of SIGGRAPH 2001, 327-340.
Kwatra, V., Schodl, A., Essa, I., Turk, G., Bobick, A.: Graphcut textures: Image and video synthesis using graph cuts. ACM Trans. Graph. 22 (2003), 3, 277-286.
Deussen O., Hiller S., Van Overveld C., Strothotte T.: Floating points: A method for computing stipple drawings. Computer Graphics Forum 19, 3 (2000).
Winkenbach G., Salesin D. H.: Computer generated pen-and-ink illustration. In Proceedings of SIGGRAPH 1994, 91-100.
Salisbury M. P., Anderson S. E., Barzel R., Salesin D. H.: Interactive pen-and-ink illustration. In Proceedings of SIGGRAPH 1994, 101-1.
Hertzmann A., Oliver N., Curless B., Seitz S. M.: Curve analogies. In Rendering Techniques 2002: 13th Eurographics Workshop on Rendering, 233-246.
Jodoin P. M., Epstein E., Granger-Piche M., Ostromoukhov V.: Hatching by example: a statistical approach. In Proceedings of NPAR 2002, 29-36.
Lloyd S. P.: Least squares quantization in pcm. IEEE Trans. on Information Theory 28, 2 (1982), 129-137.
Whyte, O., Sivic, J., and Zisserman, A. 2009. Get out of my picture! internet-based inpainting. In BMVC (British Machine Vision Conference), pp. 1-11.
U.S. Appl. No. 12/868,519, filed Aug. 25, 2010, Elya Shechtman, et al.
U.S. Appl. No. 12/857,294, filed Aug. 16, 2010, Dan Goldman, et al.
P. Bhat, B. Curless, M. Cohen, and C. L. Zitnick. Fourier analysis of the 2d screened poisson equation for gradient domain problems. In ECCV, 2008, pp. 1-14.
U.S. Appl. No. 12/394,280, filed Feb. 27, 2009, Dan Goldman, et al.
Yonatan Wexler, Eli Shechtman, Michal Irani. Space-Time Completion of Video. IEEE Transactions on Pattern Analysis and Machine Intelligence, vol. 29, No. 3, Mar. 2007, pp. 1-14.

Agarwala, A., Dontcheva, M., Agrawala, M., Drucker, S., Colburn, A., Curless, B., Salesin, D., and Cohen, M. 2004. Interactive digital photomontage. In ACM SIGGRAPH, vol. 23, pp. 294-302.
Arias, P., Facciolo, G., Caselles, V., and Sapiro, G. 2011. A variational framework for exemplar-based image inpainting. IJCV 93 (July), pp. 319-347.
U.S. Appl. No. 12/315,038, filed Nov. 26, 2008, Dan Goldman, et al.
Burt, P. J., and Adelson, E. H. 1983. A multiresolution spline with application to image mosaics. ACM Trans. Graphics 2 (October), pp. 217-236.
Marketwire.com release, "Auryn Releases "Auryn Ink" Watercolor App; Named One of the Seven Most Innovative iPad Apps o f 2010 by fast Company," Jan. 4, 2011, pp. 1-2.
Fang, H., and Hart, J. C. 2007. Detail preserving shape deformation in image editing. In ACM SIGGRAPH, vol. 26, pp. 1-5.
Hays, J., and Efros, A. A. 2007. Scene completion using millions of photographs. In ACM SIGGRAPH, vol. 26, 4:1-4: pp. 1-7.
Kwatra, V., Essa, I., Bobick, A., and Kwatra, N. 2005. Texture optimization for example-based synthesis. In ACM SIGGRAPH, vol. 24, 795-802.
giggleapps.com review, "Auryn Ink Review," Feb. 10, 2011, pp. 1-4.
Perez, P., Gangnet, M., and Blake, A. 2003. Poisson image editing. In ACM SIGGRAPH, vol. 22, pp. 313-318.
Rother, C., Bordeaux, L., Hamadi, Y., and Blake, A. 2006. AutoCollage. In ACM SIGGRAPH, vol. 25, pp. 847-852.
Simakov, D. Caspi, Y., Shechtman, E., and Irani, M. 2008. Summarizing visual data using bidirectional similarity. In CVPR, pp. 1-8.
Szeliski, R., and Shum, H.-Y. 1997. Creating full view panoramic image mosaics and environment maps. In ACM SIGGRAPH, pp. 251-258.
Tappen, M., Freeman, W., and Adelson, E. 2005. Recovering intrinsic images from a single image. IEEE Trans. PAMI 27, 9 (sept.), pp. 1459-1472.
iTunes Preview, "Auryn Inc. Auryn ink," Jul. 20, 2011, downloaded at http://itunes.apple.com/us/app/auryn-Auryn\%20Ink/id407668628, pp. 1-2.
U.S. Appl. No. 12/868,540, filed Aug. 25, 2010, Elya Shechtman, et al.
U.S. Appl. No. 13/565,552, filed Aug. 2, 2012, Elya Shechtman, et al.
Kajiya, J. T. and Kay, T. L. 1989. Rendering fur with three dimensional textures. SIGGRAPH Comput. Graph. 23, 3 (Jul. 1989), pp. 271-280.
Marschner, S. R., Jensen, H. W., Cammarano, M., Worley, S., and Hanrahan, P. 2003. Light scattering from human hair fibers. In ACM SIGGRAPH 2003 Papers (San Diego, California, Jul. 27-31, 2003). SIGGRAPH '03. ACM, New York, NY, pp. 780-791.
Barnes, C., Shechtman, E., Finkelstein, A., and Goldman, D. B. 2009. PatchMatch: a randomized correspondence algorithm for structural image editing. In ACM SIGGRAPH 2009 Papers (New Orleans, Louisiana, Aug. 3-7, 2009). H. Hoppe, Ed. SIGGRAPH '09. ACM, New York, NY, pp. 1-11.
Chen, H. and Zhu, S. 2006. A Generative Sketch Model for Human Hair Analysis and Synthesis. IEEE Trans. Pattern Anal. Mach. Intell. 28, 7 (Jul. 2006), pp. 1025-1040.
H. Chen and S. C. Zhu, "A generative model of human hair for hair sketching", CVPR (IEEE Conference on Computer Vision and Pattern Recognition), pp. 74-81, 2005.
U.S. Appl. No. 13/219,457, filed Aug. 26 2011, Stephen J Diverdi.
U.S. Appl. No. 12/858,552, filed Aug. 18, 2010.
U.S. Appl. No. 12/858,558, filed Aug. 18, 2010.
U.S. Appl. No. 12/858,546, filed Aug. 18, 2010, Winnemoeller Et al.
U.S. Appl. No. 12/857,382, filed Aug. 16, 2010, Mech Et al.
Sims, K. Artificial Evolution for Computer Graphics. Computer Graphics 25, 4 (Aug. 1991), pp. 319-328.
J. Marks, B. Andalman, P.A. Beardsley, and H. Pfister et al. Design Galleries: A General Approach to Setting Parameters for Computer Graphics and Animation. In ACM Computer Graphics (SIGGRAPH '97 Proceedings), pp. 389-400, Aug. 1997.
Igarashi, T. and J.F. Hughes, A Suggestive Interface for 3D Drawing, in Proceedings of the ACM Symposium on User Interface Software and Technology, UIST Jan. 2001, ACM: Orlando, Florida. pp. 1-9.

L. Shapira, A. Shamir, and D. Cohen-Or. Image appearance exploration by model based navigation. In Computer Graphics Forum, Eurographics, 2009 (Mar. 30 to Apr. 3, 2009) pp. 1-10.

Jonathan Duran, Deco tool and Spray Brush for creating complex, geometric patterns in Flash http://www.adobe.com/devnet/flash/articles/deco_intro.html Feb. 2, 2009, pp. 1-19.

U.S. Appl. No. 13/219,453, filed Aug. 26 2011, Diverdi Et al.

U.S. Appl. No. 13/029,036, filed Feb. 16, 2011, Adobe Systems Incorporated, all pages.

U.S. Appl. No. 13/219,848, filed Aug. 26, 2011, Adobe Systems Incorporated, all pages.

O. Deusen et al., "The Elements of Nature: Interactive and Realistic Techniques," ACM SIGGRAPH 2004 Course Note #31, Aug. 2004, pp. 1-64.

Ando, R., & Tsuruno, R. (2010). Vector fluid: A vector graphics depiction of surface flow. In NPAR '10: Proceedings of the 8th International Symposium on Non-photorealistic Animation and Rendering (pp. 129-135). New York, NY, USA: ACM, pp. 1-7.

Ando, R., & Tsuruno, R., Vector graphics depicting marbling flow. In Computers & Graphics, vol. 35, Issue 1, Feb. 2011, pp. 148-159.

Siu Hang Chu, "Making Digital Painting Organic," PhD thesis, Hong Kong University of Science and Technology, Aug. 2007, pp. 1-126.

Tom Van Laerhoven, "An Extensible Simulation Framework Supporting Physically-based Interactive Painting," PhD thesis, University of Limburg, Jun. 21, 2006, pp. 1-171.

Corel, "Corel Painter 11 Features," from the WayBackmachine, May 26, 2011, pp. 1-3.

Corel, "Corel Painter 11 Overview," from the WayBackMachine, May 26, 2010, pp. 1-3.

Chris McVeigh, "ArtRage Studio Pro 3 review", PCWorld, Feb. 12, 2010, pp. 1-4.

Ambient Design, "Artrage 3," http://www.ambientdesign.com/, from web.archive.org, May 25, 2010, ArtRage home page, p. 1.

Chen, X., Neubert, B., Xu, Y.-Q., Deussen, O., and Kang, S. B. 2008. Sketch-based tree modeling using markov random field. ACM Trans. on Graphics 27, 5, pp. 1-9.

Prusinkiewicz, Przemyslaw; Lindenmayer, Aristid (1990). The Algorithmic Beauty of Plants. Springer-Verlag. Chapter 4, pp. 101-107. ISBN 978-0387972978.

* cited by examiner

Candidate position

Best fitting element

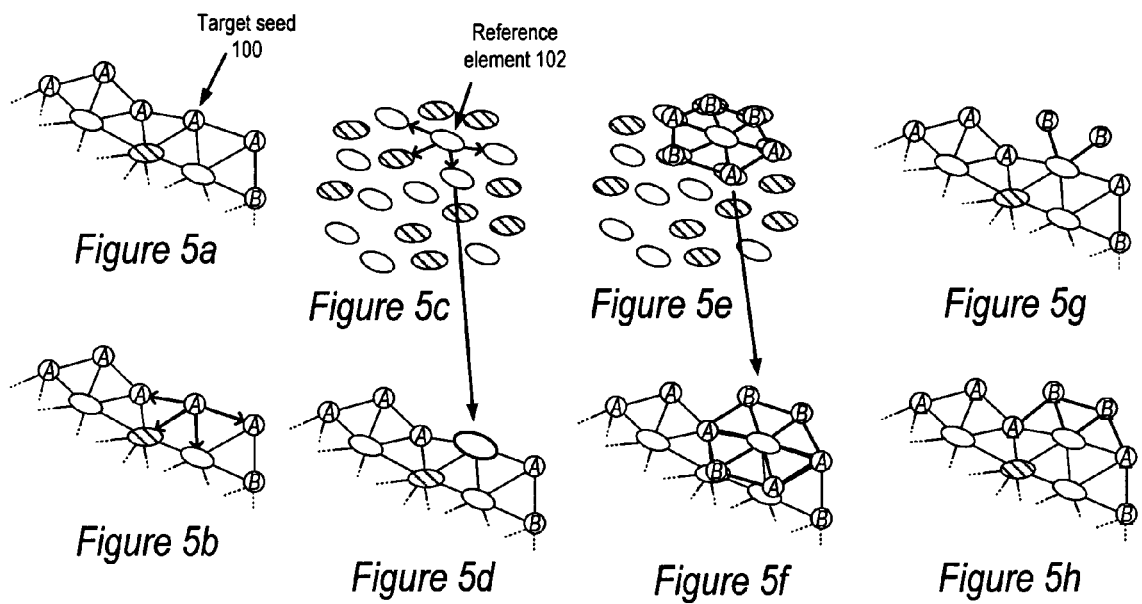
Figure 5a  Figure 5c  Figure 5e  Figure 5g
Figure 5b  Figure 5d  Figure 5f  Figure 5h
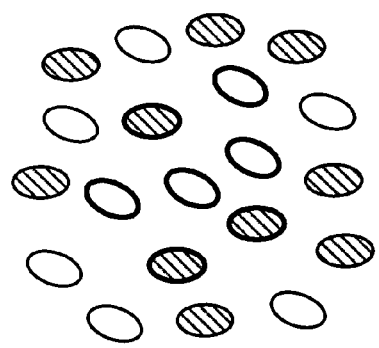
Figure 6a
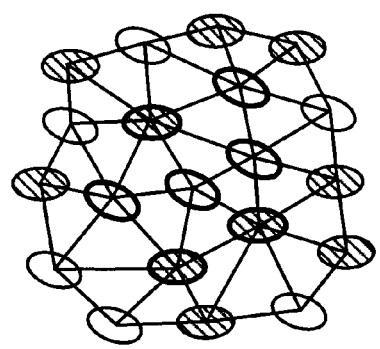
Figure 6b

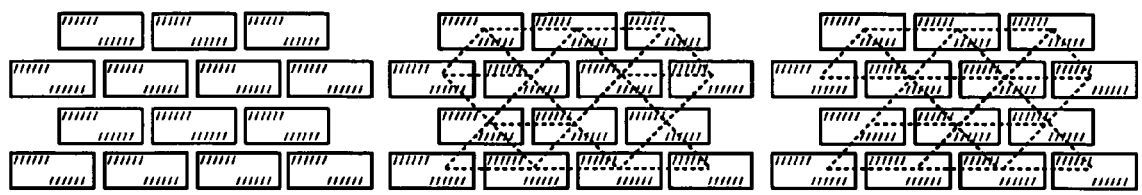
Figure 7a　　　Figure 7b　　　Figure 7c
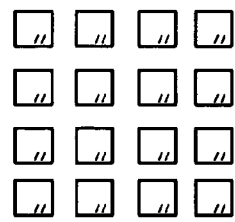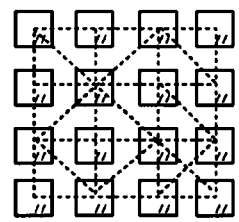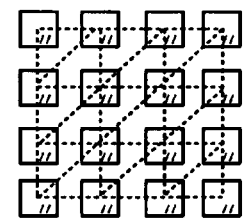
Figure 8a　　　Figure 8b　　　Figure 8c

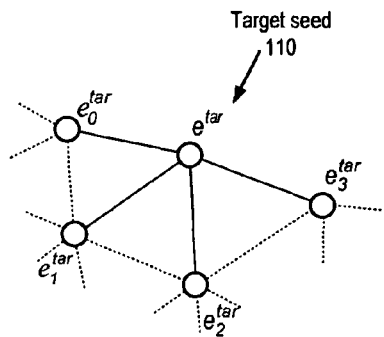
Figure 15a
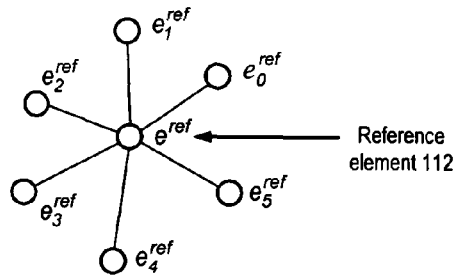
Figure 15b
$$\begin{array}{cccc} f_0 & f_1 & \Lambda & f_5 \\ e_0^{tar} - e_0^{ref} & e_1^{ref} & \Lambda & e_5^{ref} \\ e_1^{tar} - e_1^{ref} & e_2^{ref} & \Lambda & e_0^{ref} \\ e_2^{tar} - e_2^{ref} & e_3^{ref} & \Lambda & e_1^{ref} \\ e_3^{tar} - e_3^{ref} & e_4^{ref} & \Lambda & e_2^{ref} \end{array}$$
Figure 15c
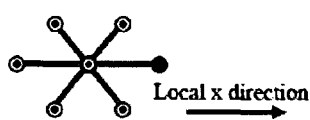
Figure 16a
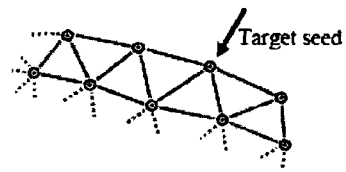
Figure 16b
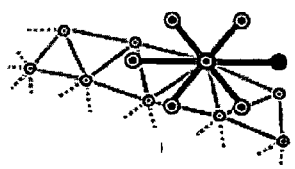
Figure 16c
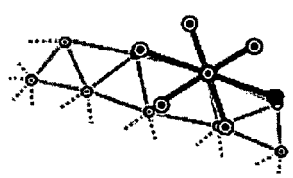
Figure 16d
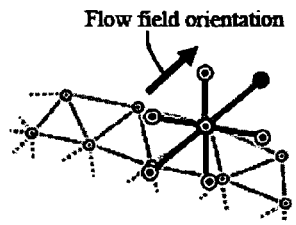
Figure 16e

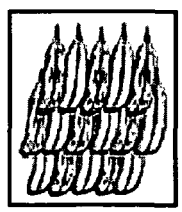 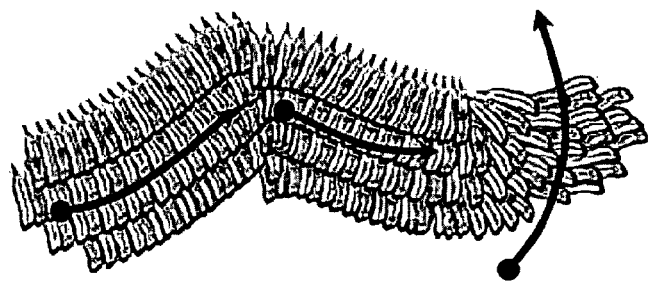
Figure 22a                    Figure 22b
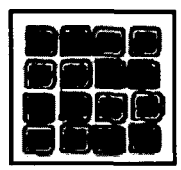 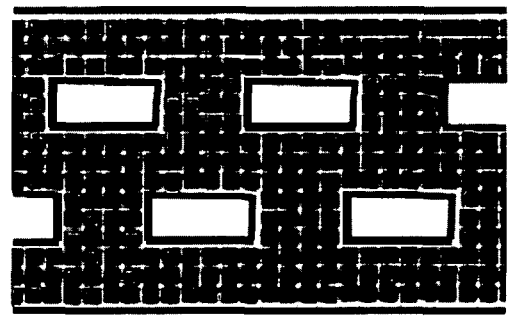
Figure 23a                    Figure 23b

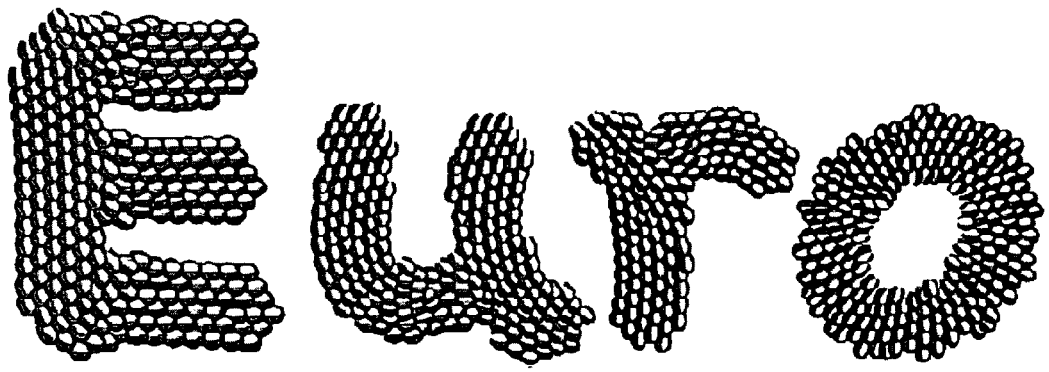
Figure 24b

EXAMPLE-BASED PROCEDURAL SYNTHESIS OF ELEMENT ARRANGEMENTS

PRIORITY INFORMATION

This application claims benefit of priority of U.S. Provisional Application Ser. No. 60/969,508 entitled "Example-Based Procedural Synthesis of Element Arrangements" filed Aug. 31, 2007, the content of which is incorporated by reference herein in its entirety.

BACKGROUND

Description of the Related Art

Element arrangements are ubiquitous in both man-made environments (e.g., tiles, building, façades, decorative art, etc.) and in the natural environment (e.g., honeycombs, flower petals, ballasts, pebble beaches, clouds, etc.). Two-dimensional (2D) arrangements of elements may be observed in either man-made or natural environments, such as tiles, wallpapers, hatching strokes, decorative arts, fabrics, flower petals, honeycombs, animal fur and scales, waves, dunes, and so on. Synthesizing element arrangements is a useful tool for texture creation and non-photorealistic rendering. The synthesis of arrangement patterns is not only useful for texture generation and non-photorealistic rendering (NPR), but it also poses an interesting challenge in computer graphics (e.g., regular pattern, near-regular pattern, and irregular distribution). These arrangements have a large variation; some of them may have regular or near-regular features throughout, others are not locally regular but they distribute irregular features uniformly (irregular uniform). To synthesize the arrangement patterns, a technique needs to preserve local spatial relationships between elements in the global distribution.

Two different groupings of techniques for generating general texture patterns are texture synthesis and procedural modeling. Texture synthesis techniques take an example image and generate a new texture. Texture synthesis techniques may be roughly categorized into three groups: frequency domain, pixel-based, and patch-based. Frequency domain techniques typically can only deal with specific types of textures. Pixel and patch based techniques may achieve convincing results for more general textures. However, it is difficult to directly apply these techniques to element arrangements, because not each pixel but each element is individually perceptible in the element arrangements. The spatial relationships between elements are more important than those between pixels.

Procedural modeling techniques deal with an element as a unit module. A procedural modeling system starts from an initial feature, and progressively replaces and adds modules based on local generation rules. However, procedural frameworks are limited to patterns in which elements have explicit local structure such as trees. For instance, it is difficult to define the growth rules for irregular uniform arrangements. Although some procedural modeling techniques have achieved impressive results, these techniques typically require the user to write scripts to define the local growth rules, which makes it difficult for novice users to control the resulting model.

Stroke Pattern Synthesis

Stroke pattern synthesis is a popular topic in the Non-photorealistic rendering (NPR) field. A stroke pattern synthesis technique synthesizes stroke patterns based on generating rules that are manually selected or observed on traditional drawings. Example-based systems have been developed that typically focus on a relatively simple case, in which all strokes are aligned in a linear order on a curve. Stroke based analysis and synthesis techniques may have difficulty dealing with regular or near-regular patterns, and when synthesizing structured patterns such as brick walls.

SUMMARY

Various embodiments of a method and apparatus for synthesizing element arrangements from an example are described. Embodiments may, for example, synthesize element arrangement patterns from an example arrangement. Embodiments may operate, not through scripting as in conventional methods, but via the giving of examples. In contrast to an approach used in texture synthesis that deals with pixels aligned on a grid, the target of embodiments may be an element arrangement in which elements may not necessarily be aligned. Thus, embodiments may consider a "spatial" neighborhood characteristic of each element. Embodiments may combine a texture synthesis technique based on local neighborhood comparison of an example (a reference arrangement) and a target with procedural modeling based on local growth.

One embodiment may take a reference arrangement, for example an example input or otherwise specified by a user, and analyze the local structure by constructing the connectivity among elements of the arrangement. Given the reference arrangement, embodiments may construct connectivity to get immediate neighborhood information of each element. The synthesis process may start with a single seed and expand the pattern being synthesized outward by placing new elements at new seed locations one by one. In one embodiment, this process may apply local neighborhood comparison: a reference element may be selected from the reference arrangement that has neighborhood features that are most similar to the features of the neighborhood of the target seed in the synthesized pattern.

Embodiments may take an input exemplary arrangement of elements, which may be referred to as a reference arrangement, and generate or synthesize a new larger pattern which is similar to the reference arrangement. The reference arrangement may use one or more symbols from a predefined set of symbols. Each symbol in this set may have or be assigned a symbol identifier (symbol ID). In addition, each symbol in the reference arrangement has or is assigned a unique identifier, referred to herein as a sub-ID that may be used in the synthesis process to differentiate between symbols that have the same symbol ID.

Various embodiments may provide one or more different modes in the local growth process. The modes may include one or more of, but are not limited to, a non-rotation mode, in which the system may use the reference element without rotation; a rotation mode, in which the system searches for the best fitting reference element considering the rotation, which may result in a better distribution; and a flow field mode, in which the system rotates the reference to adjust its local coordinate to the user-specified underlying flow field direction.

Various embodiments may provide one or more different types of tools via a user interface for controlling global aspects of resulting arrangements. The tools may include a painting tool, for example a spray tool, that activates seeds under the cursor area. This tool allows the user to paint the arrangement pattern. The tools may also include a flow field tool that allows the user to design flow fields by drawing a set of strokes. The system may use the directions of the input strokes as constraints and interpolate 2D space, for example using radial basis functions. The tools may also include a boundary tool that allows the user to draw a set of boundary strokes that limit or stop the local growth.

Embodiments of a method and apparatus for synthesizing element arrangements from an example may be implemented as an example-based procedural pattern synthesis module in a stand-alone application or as a module of a graphics application or graphics library. Examples of graphics applications in which embodiments may be implemented include, but are not limited to, painting, publishing, photography, games, animation, and/or other applications.

BRIEF DESCRIPTION OF THE DRAWINGS

FIGS. 5a through 5h illustrate an exemplary local growth process, showing an example of a single iteration step, according to one embodiment.

FIGS. 6a and 6b illustrate the generation of connectivity for a given reference arrangement according to one embodiment.

FIGS. 7a through 7c illustrate examples of reference arrangements and connectivity among the elements according to one embodiment.

FIGS. 8a through 8c illustrate examples of reference arrangements and connectivity among the elements according to one embodiment.

FIGS. 15a through 15c illustrate an example of matching a pattern according to one embodiment.

FIGS. 16a through 16e illustrate the results of various modes on the process of fitting an element from a reference arrangement to a target seed, according to one embodiment.

FIGS. 22a-22b illustrate exemplary results created using a flow field user interface tool, according to one embodiment.

FIGS. 23a-23b illustrate exemplary results created a boundary user interface tool, according to one embodiment.

FIGS. 24a-24b illustrate exemplary results created using a painting user interface tool such as a spray tool, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for synthesizing element arrangements from an example are described. Embodiments may, for example, synthesize element arrangement patterns from an example pattern including multiple elements of one or more types. Various embodiments may use a combination of one or more texture synthesis methods based on a local neighborhood comparison and one or more procedural modeling systems based on a local growth. Embodiments may provide a computer-implemented element arrangement synthesis system via an easy to use framework. Embodiments may operate, not through scripting as in conventional methods, but via the giving of examples. Embodiments may provide a controllable synthesis process via one or more tools including, but not limited to, a painting (e.g., spray) tool, a flow fields tool, and a boundary tool.

Embodiments may combine a texture synthesis technique based on local neighborhood comparison of an example, which may be referred to as a reference arrangement, and a target with procedural modeling based on local growth. Embodiments may focus on element arrangements, and may not synthesize each element shape. In one embodiment, each element of the reference arrangement has or is assigned a symbol identifier (ID) that uniquely identifies a type of the element in the reference arrangement and a sub-ID that uniquely identifies the element in the reference arrangement.

Embodiments of a method and apparatus for synthesizing element arrangements from an example may be implemented as an example-based procedural pattern synthesis module in a stand-alone application or as a module of a graphics application or graphics library. Examples of graphics applications in which embodiments may be implemented include, but are not limited to, painting, publishing, photography, games, animation, and/or other applications.

Figure 1A:
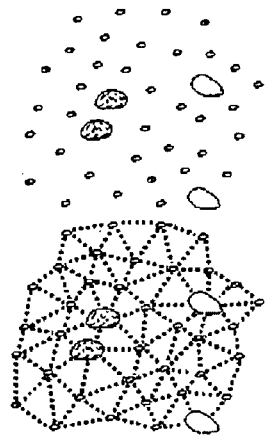
FIGS. 1a through 1c illustrate synthesizing a pattern from an example according to one embodiment.
Figure 1B:
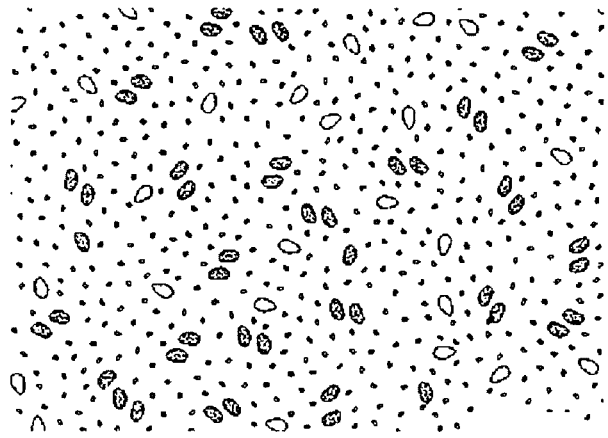
Figure 1C:
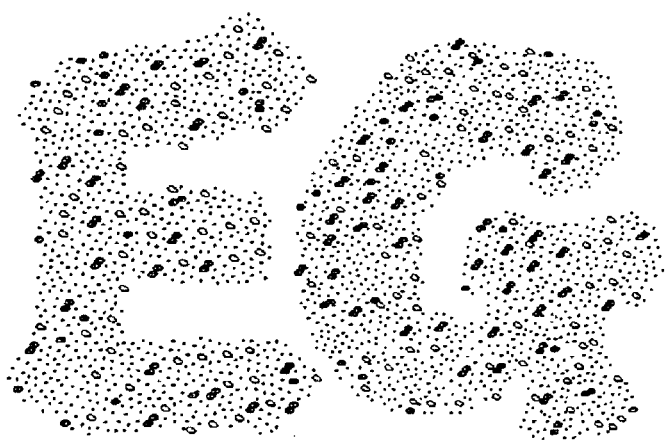

Referring to FIGS. 1a through 1c, one embodiment may take a reference arrangement, which may be input or otherwise specified by a user, and analyze the local structure by constructing the connectivity. Given the reference arrangement, embodiments may construct connectivity to get immediate neighborhood information of each element (see FIG. 1a). The synthesis process starts with a single seed and expands the pattern being synthesized outward by placing new elements one by one. In one embodiment, this process may apply local neighborhood comparison; a reference element may be selected from the reference arrangement that has the neighborhood feature that is most similar to the target place of a previously synthesized pattern. A larger pattern may then be synthesized that has a similar local structure, as illustrated in FIG. 1b, which shows an exemplary synthesized pattern in which almost all elements are uniformly distributed, but two gray elements typically appear to be adjacent. One or more user interface tools may be provided for painting, drawing, or performing other functions with the arrangement pattern and for controlling the flow field. For example, FIG. 1c shows exemplary results of an exemplary painting tool such as a spray tool that may be provided by an embodiment.

Figure 2A:
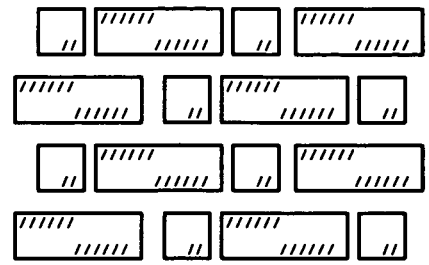
FIGS. 2a through 2c illustrate exemplary symbol IDs and sub-IDs for elements in an exemplary reference arrangement according to one embodiment.
Figure 2B:
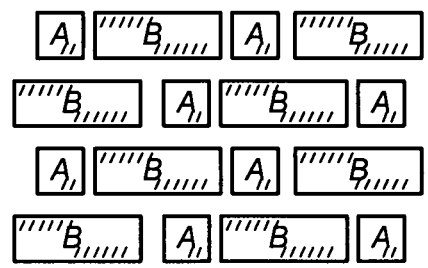
Figure 2C:
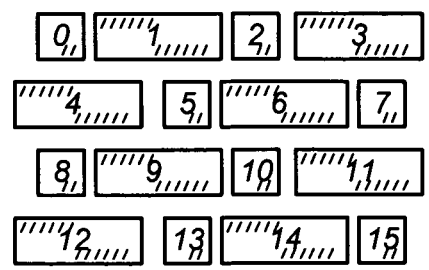

Embodiments may take an arrangement of input elements, which may be referred to as a reference arrangement, and generate or synthesize a new larger pattern which is similar to the reference arrangement. The reference arrangement may use one or more symbols from a predefined set of symbols. Each symbol in this set has a symbol identifier (symbol ID). In addition, each symbol in the reference arrangement has or is assigned a unique identifier, referred to herein as a sub-ID, that may be used in the synthesis process to differentiate between symbols that have the same symbol ID. FIG. 2a illustrates a reference arrangement according to one embodiment. FIG. 2b illustrates symbol IDs for the elements of the reference arrangement in FIG. 2a according to one embodiment. FIG. 2c illustrates sub-IDs for the elements of the reference arrangement in FIG. 2a according to one embodiment.

In one embodiment, the focus is on element arrangements, so shapes of symbols may not be synthesized. Instead, this embodiment may allow the user to introduce random noise to modify the rotation and the scale of synthesized elements to thus obtain more variation.

Various embodiments may provide one or more different modes in the local growth process. The modes may include one or more of, but are not limited to:
- A non-rotation mode, in which the system may use the reference element without rotation.
- A rotation mode, in which the system searches for the best fitting reference element considering a rotation of the reference element, which may result in a better distribution.
- A flow field mode, in which the system rotates the reference to adjust its local coordinate to the user-specified underlying flow field direction. This allows controlling a global flow of a synthesized arrangement.

To support a creative design process, various embodiments may provide one or more different types of tools via a user interface for controlling global aspects of resulting arrangements. The tools may include one or more of, but are not limited to:
- A painting tool, for example a spray tool, which activates seeds under the cursor area. This tool allows the user to paint the arrangement pattern. Embodiments are fast enough to return immediate feedback.
- A flow field tool that allows the user to design flow fields by drawing a set of strokes. The system may use the directions of the input strokes as constraints and interpolates 2D space, for example using radial basis functions.
- A boundary tool that allows the user to draw a set of boundary strokes which stop the local growth.

In contrast to an approach used in texture synthesis that deals with pixels aligned on a grid, the target of embodiments may be an element arrangement in which elements may not necessarily be aligned. Thus, embodiments may consider a "spatial" neighborhood characteristic of each element.

Figure 3A:
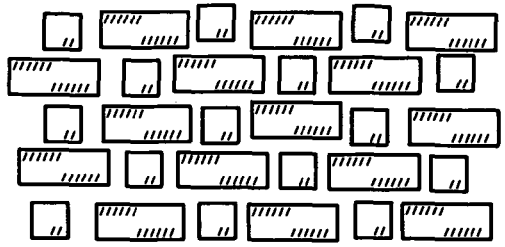
FIGS. 3a through 3e illustrate exemplary analysis and synthesis stages according to one embodiment.
Figure 3B:
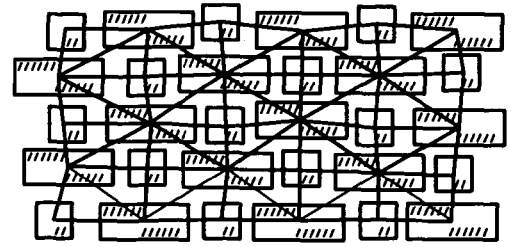
Figure 3C:
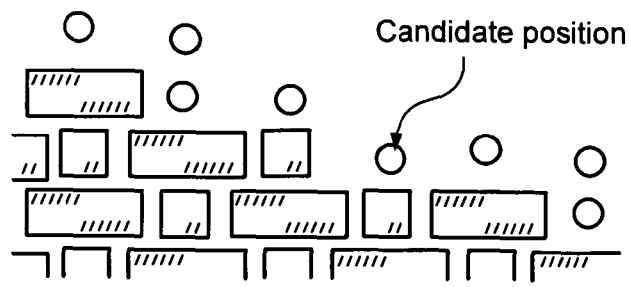
Figure 3D:
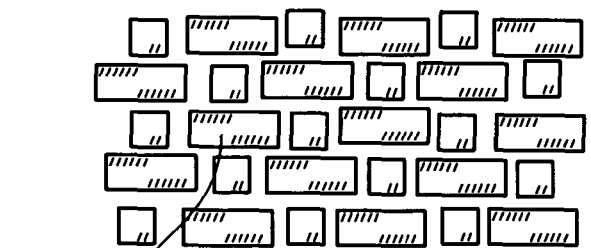
Figure 3E:
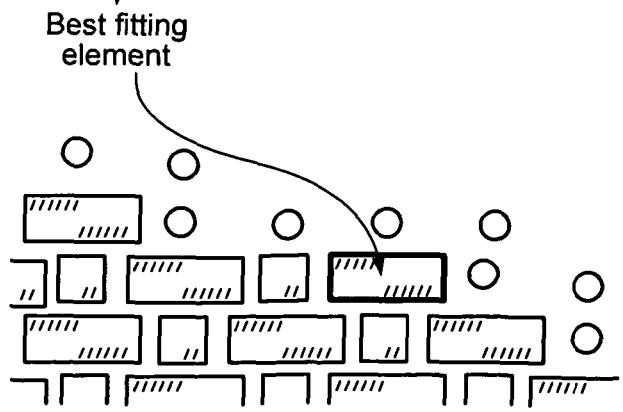

FIGS. 3a through 3e illustrate exemplary analysis and synthesis stages according to one embodiment. FIGS. 3a and 3b illustrate an analysis stage. In FIG. 3a, an example or reference arrangement is provided. In FIG. 3b, connections of the elements in the reference arrangement are constructed. FIGS. 3c through 3e illustrate a synthesis stage for synthesizing a pattern based on the reference arrangement. In FIG. 3c, the circles represent seeds. A candidate position for a new element (the candidate seed) is indicated. In FIG. 3d, a best fitting element from the reference arrangement of FIG. 3a is found. In FIG. 3e, the candidate seed is replaced with the element. New seeds may be generated. The process iteratively repeats, placing single reference elements in the pattern, until the desired pattern area has been filled.

Figure 4:
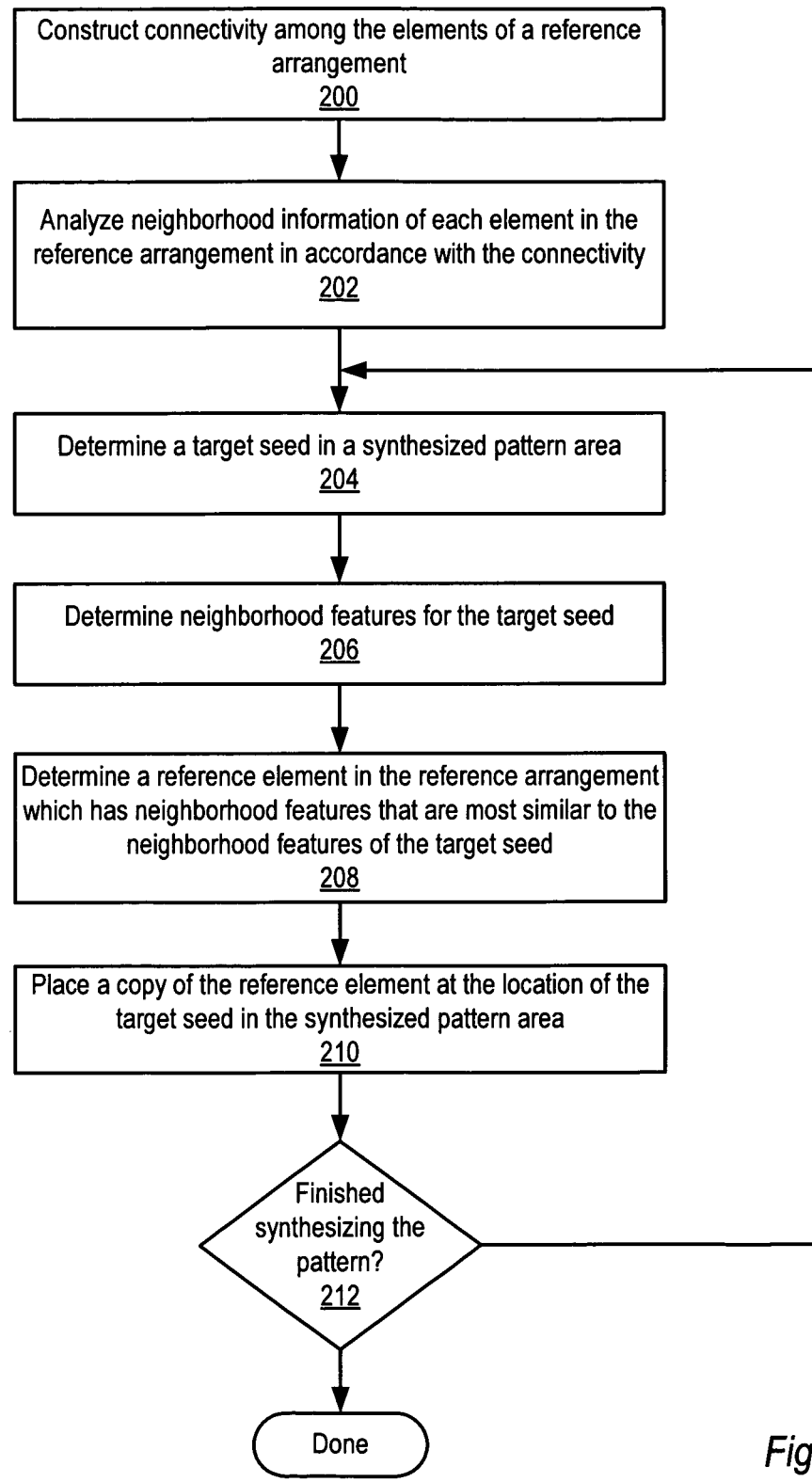
FIG. 4 is a flowchart illustrating a method for synthesizing element arrangements from an example according to one embodiment.

FIG. 4 is a flowchart illustrating a method for synthesizing element arrangements from an example according to one embodiment. At 200, connectivity among the elements of a reference arrangement may be constructed. The reference arrangement may, for example, be a user-specified pattern including a plurality of elements, with one or more types of elements. At 202, neighborhood information of each element in the reference pattern may be analyzed in accordance with the constructed connectivity. At 204, a target seed in a synthesized pattern area may be determined. For example, the user may click on a location on the screen using a tool such as a spray tool to indicate a starting location, and the starting location may be used as the initial target seed. Other methods may be used to determine an initial target seed and subsequent seeds. At 206, neighborhood features for the target seed may be determined. An initial seed may not yet have neighbors, so for an initial seed, a default "neighborhood" may be assumed, or some other method (e.g., random placement) of determining neighborhood features for an initial seed may be used. At 208, a reference element in the reference arrangement which has neighborhood features that are most similar to the neighborhood features of the target seed may be determined. As indicated at 210, a copy of the reference element may be placed at the location of the target seed in the synthesized pattern area. New seeds may be generated, for example using neighborhood information of the reference element. At 212, if not finished synthesizing the pattern, then the process returns to 204 to determine a next target seed. If finished, the synthesizing of the pattern is complete.

FIGS. 5a through 5h illustrate an exemplary local growth process, showing an example of a single iteration step, according to one embodiment. In this example, the symbol ID of white stone is A, and the symbol ID of gray stone is B. Given a reference arrangement, local relationships between neighboring elements may be analyzed in an analysis stage, for example by triangulating the reference arrangement. The synthesis process or stage begins with placing a single seed. The seed is iteratively replaced with a reference element from the reference arrangement and several new seeds. In each iteration, connectivity for new elements and seeds may be constructed, which supports obtaining neighborhoods of seeds. FIGS. 5a through 5h, which show an example of a single iteration step, graphically illustrate several stages of an exemplary process performed in each iteration. In FIG. 5a, a seed is selected as the target seed 100. In FIG. 5b, the neighborhood of the selected seed 100 is checked to construct connectivity, as indicated by the arrows. In FIG. 5c, a reference element 102 that has the most similar neighborhood condition to that of the selected seed 100 is found in the reference arrangement. In FIG. 5d, the target seed 100 is replaced with the copy of the found reference element 102. In FIGS. 5e and 5f, the process gets copies of the neighboring elements of the reference element 102. In FIG. 5g, the process places non-fitted parts of the copies as new seeds. In FIG. 5h, edges are constructed. In one embodiment, global relaxation may be introduced after each growth process in order to obtain a smooth pattern.

FIGS. 6a and 6b illustrate the generation of connectivity (FIG. 6b) for a given example or reference arrangement (FIG. 6a) in the analysis stage according to one embodiment. To construct connectivity, in one embodiment, Delaunay triangulation may be used. In one embodiment, skewed triangles (e.g., any triangle that includes an angle greater than a specified threshold, e.g. 150 degrees) may be removed. In one embodiment, only non-boundary elements may be used. In one embodiment, the user may be allowed to modify the connectivity via one or more provided user interface elements or controls. Embodiments may calculate the longest and shortest edge lengths. In one embodiment, a Gaussian distribution may be assumed.

In one embodiment, given an input reference arrangement or elements, connectivity may be extracted using a mathematical triangulation technique such as Delaunay triangulation. In one embodiment, the center position of each element may be used in triangulation. Delaunay triangulation may generate skewed triangles around the boundary; thus, one embodiment may remove skewed triangles, for example triangles that have angles greater than $2/3*\pi$, and only edges which are a part of at least one unskewed triangle may be kept. Relative positions, symbol IDs, and sub-IDs of immediate neighborhoods of each element may then be registered. In one embodiment, elements around the boundary of the reference arrangement may not be used, since they do not have enough neighborhood elements.

When regular or near-regular arrangements are input, a triangulation technique such as Delaunay triangulation may generate undesired connections. FIGS. 7a through 7c and 8a through 8c illustrate some examples of reference arrangements and connectivity among the elements according to one embodiment. In FIG. 7b, several generated edges connect blocks over one row for an arrangement as input in FIG. 7a. In FIG. 8a, near-regular arrangement is input; however generated edges have no regularity in FIG. 8b. The synthesis algorithm described herein may be affected by local connectivity of each element, and thus these connections may break regular patterns. Thus, one embodiment may allow the user to correct the connection after the triangulation. For example, in one embodiment, the user may be allowed to flip an edge by clicking on in or by some other user interface tool or method. This may allow the user to obtain the desired connectivity. Thus, in one embodiment, the system may automatically generate connectivity, as illustrated in FIGS. 7b and 8b, for reference arrangements as illustrated in FIGS. 7a and 8a, and the user may modify the topology using one or more tools provided by the embodiment to reconstruct underlying regularity, as illustrated in FIGS. 7c and 8c.

Figure 9A:
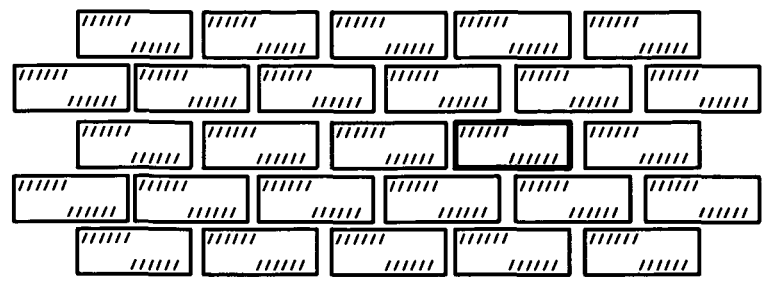
FIGS. 9a through 9c illustrate user-guided connectivity correction according to one embodiment.
Figure 9B:
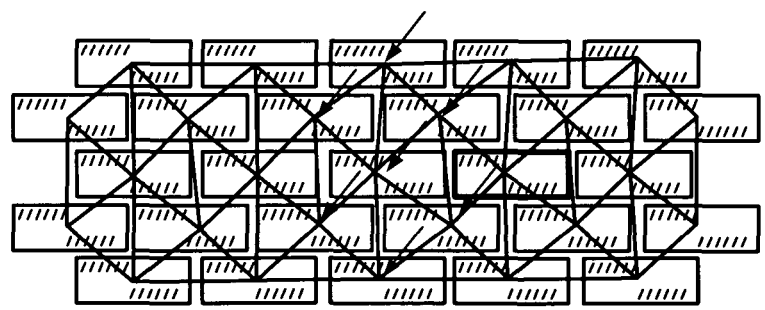
Figure 9C:
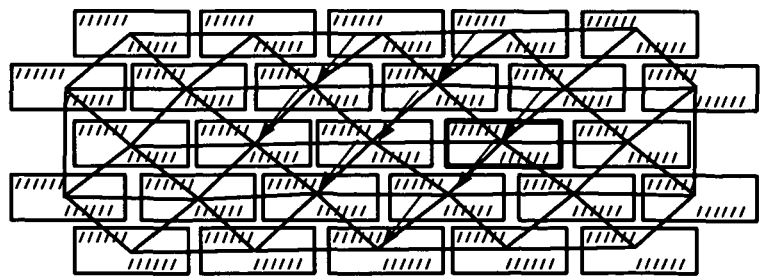

FIGS. 9a through 9c illustrate user-guided connectivity correction according to one embodiment. FIG. 9a illustrates an exemplary initial reference arrangement. FIG. 9b illustrates an exemplary system-generated connectivity. FIG. 9c illustrates an exemplary connectivity as corrected by the user.

Synthesis by Local Growth

One embodiment may begin with an element at the center of the pattern and expand it outward by placing new elements one by one based on neighborhood comparisons of the previously synthesized elements. However, target element arrangements are not always supposed to have regular structures as in the case of pixels on a grid. The position for placing a new element and its neighborhood may be unclear. Furthermore, the size and orientation of individual elements may differ. These are major differences between conventional texture synthesis techniques and the method described herein.

In one embodiment, to address this problem, an example-based procedural method may be used that defines a local growth of seeds based on connectivity of elements in the reference arrangement. In each growth step, in addition to replacing a seed with the best fitting reference element, new seeds may be placed by copying the immediate neighborhood of the chosen reference element.

Seeding

The seed is a candidate position of a new element. Optionally, a seed has a symbol ID associated with it. The symbol ID may be used to cause a seed to become a certain type of element, but it could be any element of the same symbol ID (same type of element) from the reference arrangement.

In one embodiment, the synthesis process may begin by placing a single seed. In one embodiment, seeds may be sorted by the distance from the initial seed, and in each growth step a nearest seed may be selected. For example, in a spray tool mode, a new seed may be generated at the cursor position when the user starts painting, and the spray tool may grow all the seeds that are within a user-specified, or otherwise indicated, distance from the cursor during painting.

Figure 10A:
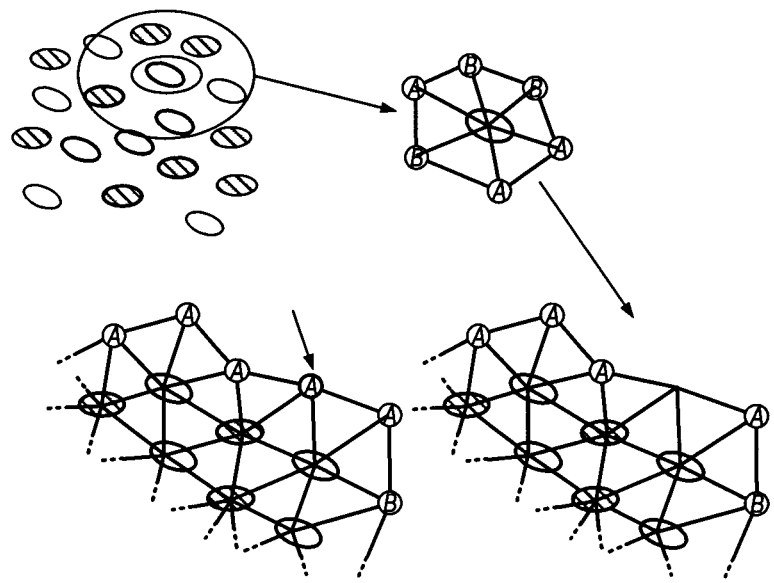
FIGS. 10a through 10c illustrate seeding according to one embodiment.
Figure 10B:
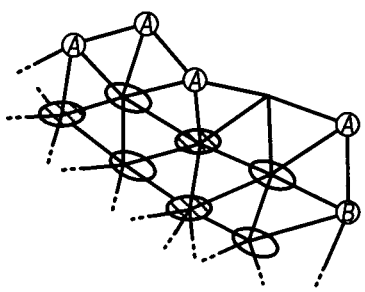
Figure 10C:
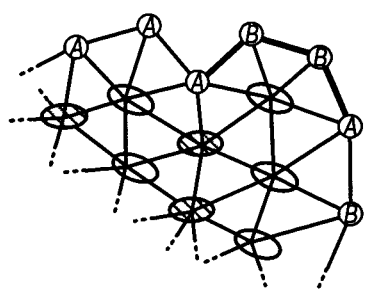

FIGS. 10a through 10c illustrate seeding according to one embodiment. Each seed has a symbol ID. In FIG. 10a, the best fitting element from the reference arrangement is found. In FIG. 10b, the new seed is placed. In one embodiment, non-matched neighborhoods are placed as new seeds. In FIG. 10c, a ring edge is added. Relaxation may be performed. Relaxation is further described below.

There may be some arrangement patterns in which elements have different importance. For example, an arrangement pattern may place larger element(s) first and fill spaces with smaller element(s) later. One embodiment may provide this effect by specifying the priority of elements to be placed at seeds based on the elements' symbol IDs. One embodiment may grow only seeds with the highest or the same priority in their neighboring area. For example, one embodiment may define the neighboring area as a circle with the radius 5*l, where l is the average length of edges in the reference. For example, in FIG. 1b, a higher priority is specified for the larger gray stones and white stones, and a lower priority is specified for the small stones that are used as fillers only.

Figure 11A:
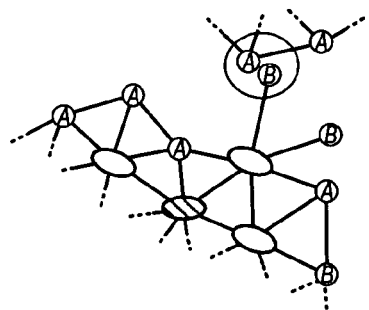
FIGS. 11a and 11b illustrate an example of the merging of seeds according to one embodiment.
Figure 11B:
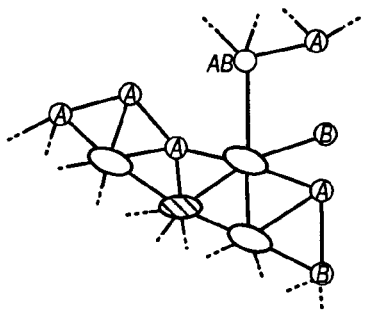
Figure 12A:
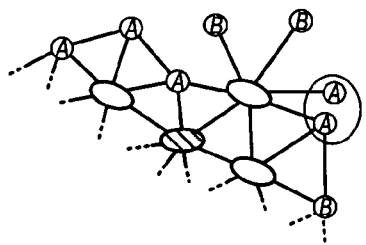
FIGS. 12a and 12b illustrate an example of the merging of seeds according to one embodiment.
Figure 12B:
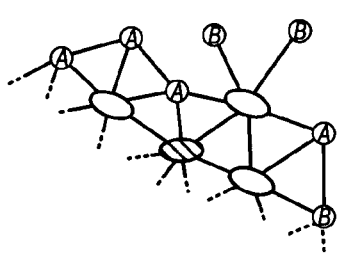

FIGS. 11a and 11b and FIGS. 12a and 12b illustrate two examples of the merging of seeds according to one embodiment. In FIGS. 11a and 12a, the neighboring area of a new seed is checked to see if there is an element or seed within a specified distance of the seed. If there is an element or seed close to the new seed, the new seed and the nearby seed or element may be merged, as illustrated in FIGS. 11b and 12b.

Figure 13A:
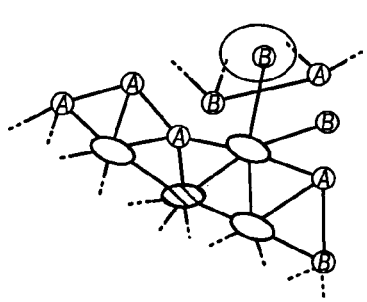
FIGS. 13a through 13c illustrate handling collisions according to one embodiment.
Figure 13B:
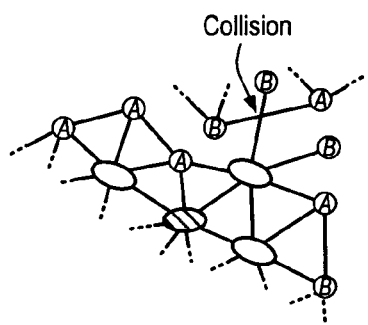
Figure 13C:
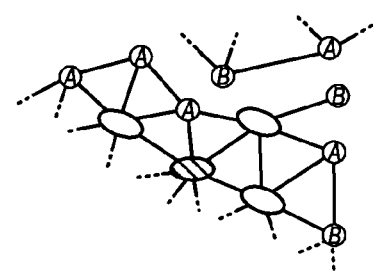

FIGS. 13a through 13c illustrate handling collisions according to one embodiment. In FIG. 13a, the neighboring area of a new seed is checked to see if there is a collision. FIG. 13b illustrates a detected collision. In FIG. 13c, the new seed has been deleted.

Figure 14A:
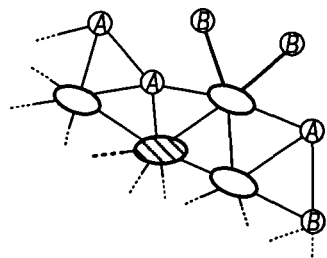
FIGS. 14a through 14f illustrate generating a ring edge according to one embodiment.
Figure 14B:
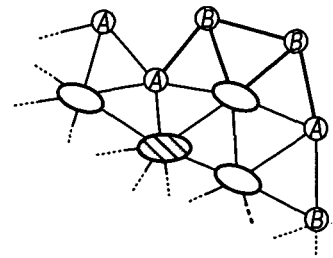
Figure 14C:
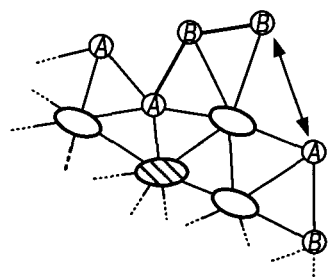
Figure 14D:
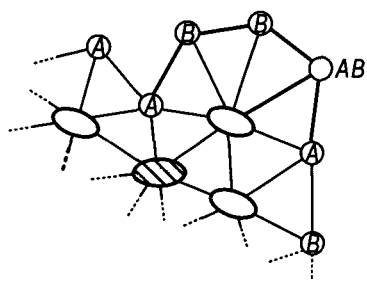
Figure 14E:
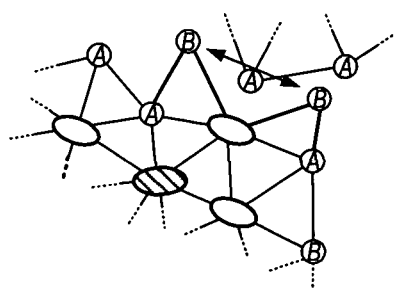
Figure 14F:
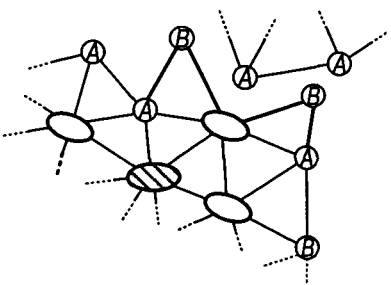
Figure 17A:
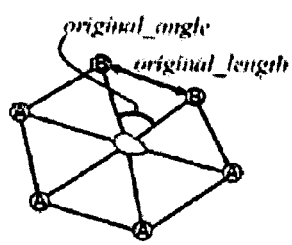
FIGS. 17a through 17f illustrate a heuristic approach that may be used to avoid undesired structures according to one embodiment.
Figure 17B:
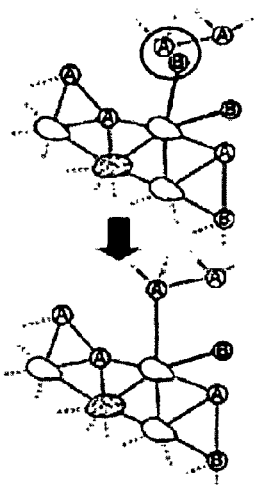
Figure 17C:
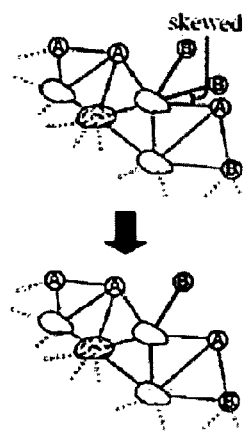
Figure 17D:
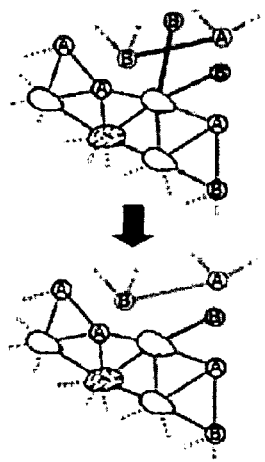
Figure 17E:
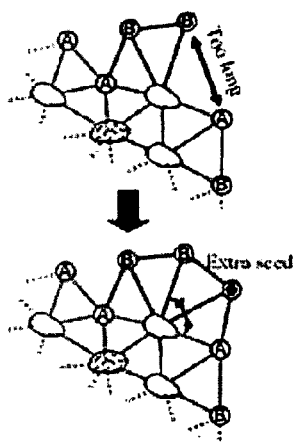
Figure 17F:
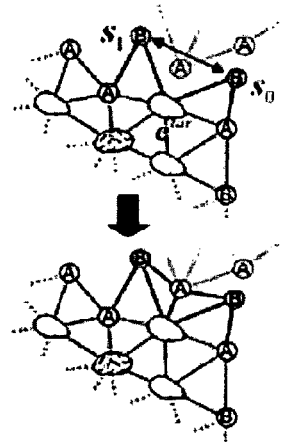

FIGS. 14a through 14f illustrate generating a ring edge according to one embodiment. In FIGS. 14a and 14b, one ring edge is generated. In FIG. 14c, the length of the new edge is checked. If the length is longer than the longest edge length in the reference arrangement, then an extra seed may be added as illustrated in FIG. 14d. In FIG. 14e, collisions are checked for. If a collision is detected, then no edge is generated, as illustrated in FIG. 14f.

Finding the Best Matching Element

FIGS. 15a through 15c illustrate an example of matching a pattern according to one embodiment. The system constructs a set of matching patterns between neighbors of the target seed 110 in FIG. 15a and that of a reference element 112 in FIG. 15b. In FIG. 15c, correspondences are defined.

Referring to FIGS. 15a through 15c, let $e^{tar}$ (target seed 110) be a focused seed in the synthesized pattern and $w(e^{tar})$ be a set of its immediate neighborhood elements. Similarly, $e^{ref}$ (reference element 112) and $w(e^{ref})$ are notations for reference elements. An error function may be defined based on differences between $w(e^{tar})$ and $w(e^{ref})$, and all reference elements may be examined to find one which minimizes the error function:

$$\min_{e^{ref} \in reference} \text{ERROR}(w(e^{tar}), w(e^{ref})) \qquad (1)$$

Note that if the target seed has a symbol ID, only corresponding reference elements (reference elements with the same symbol ID) may be examined.

Neighborhood comparisons for element arrangements are more complex than for texture synthesis because the number and position of neighboring elements may vary depending on distributions. In one embodiment, the difference may be computed in two steps. First, a matching f may be constructed which matches each element of the target neighborhood to an element of reference neighborhoods. There are several candidate matching patterns so we need to construct a set of matching patterns F. Second differences for the all relevant pairs may be calculated, and summations may be taken with respect to each f∈F.

In one embodiment, to build a set of matching patterns F, only cases which have no skipping and flipping may be considered. First, elements $e_i^{tar} \in w(e^{tar})$ and $e_j^{ref} \in w(e^{ref})$ may be sorted in counter-clockwise order. Elements may be sorted in other orders than counter-clockwise. For target neighbors, one embodiment may start with the element that is on the boundary (see FIG. 15a). One embodiment may choose $e_0^{tar}$ and $e_0^{ref}$ as an initial pair, and match subsequent elements $e_i^{tar}$ and $e_i^{ref}$ incrementally, to obtain one correspondence $f_0$. In a similar manner, one embodiment may obtain $f_k$ by choosing $e_0^{tar}$ and $e_k^{ref}$ as an initial pair. In the example given in 15a through 15c, six matching patterns are obtained.

One embodiment may assume that the size of $w(e^{tar})$ is equal or less than that of $w(e^{ref})$ and that the target seed is on the boundary, because the target seed is under growth and the number of its neighboring elements is relatively small. However, exceptional cases may occasionally occur. For instance, all neighboring elements of the seed may have already been placed due to the difference of the priority or to the use of a spray tool. When the seed does not lie on the boundary, one embodiment may sort the sort from an arbitrary element, and when the size of $w(e^{tar})$ is greater than $w(e^{ref})$, simply ignore such a reference element.

Once a set of matching patterns is obtained, one embodiment may define the error function with respect to each f∈F as follows:

$$\text{error}(w(e^{tar})), \qquad (2)$$

$$w(e^{ref}) = \sum_{i,j \in f} w_1 d(e_i^{tar}, e_j^{ref}) + w_2 id(e_i^{tar}, e_j^{ref}) + w_3 subid(e_i^{tar}, e_j^{ref})$$

The $d(e^{tar}, e^{ref})$ is an Euclidean distance between relative positions of $e^{tar}$ and $e^{ref}$. The $id(e^{tar}, e^{ref})$ returns 1 if the symbol ID of $e^{tar}$ is different than that of $e^{ref}$, and otherwise returns 0. These two terms measure the local spatial relationship. In one embodiment, the $subid(e^{tar}, e^{ref})$ may be used to avoid the same element recursively appearing again and again. This function returns 1 if sub_ids of $e^{tar}$ and $e^{ref}$ are the same, and otherwise returns 0. In one embodiment, if the weight $w_3$ is large (above a specified threshold), the structure of the reference arrangement may be better preserved in the resulting patterns. One embodiment may define the error function:

$$\text{ERROR}(w(e^{tar}), w(e^{ref})) = \min_{f \in F} \text{error}(w(e^{tar}), w(e^{ref})) \qquad (3)$$

Rotation Modes

Various embodiments may provide one or more modes to generate different results for different purposes. A non-rotation mode may be provided that may be used to generate patterns preserving the orientation of the reference neighborhood. A rotation mode may be provided that changes the orientation of the reference element neighborhood to adjust it to the orientation of the local target neighborhood, resulting in a better distribution. A flow field mode may be provided that generates patterns following a user specified flow field, for example specified by the user through application of a flow field tool as described herein. Embodiments may achieve these effects by modifications to the process of finding the best matching elements, as illustrated by way of example in FIGS. 16a through 16e. The system fits an exemplary reference element, shown in FIG. 16a, to an exemplary target seed, shown in FIG. 16b, differently depending on the selected mode. FIG. 16c shows exemplary results of non-rotation mode. FIG. 16d shows exemplary results of rotation mode. FIG. 16e shows exemplary results of flow field mode.

In the non-rotation mode, the best fitting element may be found without rotating the reference pattern (the reference element and its neighborhood); the error function (1) is solved as is. In the rotation mode, the best fitting rotation may be considered when calculating the error function (2). In one embodiment, positional differences may be minimized by rotating the reference element with angle theta:

$$\min_{\theta} \sum_{i,j \in f} d(e_i^{tar}, R_\theta(e_j^{ref})) \qquad (4)$$

where $R_\theta(e_j^{ref})$ rotates relative position of $e_j^{ref}$. In one embodiment, one of various shape matching methods may be applied.

In the flow field mode, the user-specified flow field may be considered when finding the best match. The orientation of the flow field at the target seed position may be obtained. The entire reference pattern may then be rotated to adjust its local x coordinate to the orientation, to thus obtain $e^{ref\_flow}$ and $w(e^{ref\_flow})$. The rotated reference may be used when finding the best match.

Local Growth

Using embodiments of the above-described processes, the best fitting reference element may be found, and optionally the best fitting rotation in the rotation mode or the flow field rotation in the flow field mode. One embodiment may locally grow the target seed by using the best fitting element and its neighboring points or elements, which form what may be referred to as a ring shape. Note that, if one of these rotations is available, it may be applied to the reference element and its ring shape before the following described process.

Referring again to FIGS. 5a through 5h, in one embodiment, the system first replaces the target seed 100 with the found reference element 102 (see, for example, FIGS. 5c and 5d). The system copies the symbol ID and the sub ID. The system next places the new seeds by using the neighboring elements of the found element 102; these neighboring elements form what is referred to herein as a ring shape. The system overlays the copy of the reference ring shape with the target seed neighborhood (see, for example, FIG. 5f), and then deletes every neighboring element which was paired to a target neighboring element when calculating the error function. The remaining elements will form new seeds with a corresponding symbol ID (see, for example, FIG. 5g). Finally, edges are constructed to connect new seeds (see, for example, FIG. 5h).

To avoid too dense or too sparse of a distribution and/or collisions of edges, embodiments may implement one or more heuristics during the local growth process. FIGS. 17a through 17f illustrate a heuristic approach that may be used to avoid undesired structures according to one embodiment. After obtaining new seeds, one embodiment may check the neighboring area of each new seed. If an existing element or seed within the distance threshold $l^{short}$ from the seed is found, the seed is deleted, and the edge is connected to the found object. One embodiment may use one half the shortest edge length in the reference as $l^{short}$. Other embodiments may use other lengths for or methods to calculate $l^{short}$. One embodiment may check the angle between new edges; if the angle is less than 0.5*original_angle, the new seed and edge are deleted (see FIG. 17c). The original_angle is the corresponding angle between edges in the chosen reference ring shape (see FIG. 17a). One embodiment may check for a collision of the edge of the new seed; if detected, the seed and the edge are removed (see FIG. 17d). When constructing new edges around new seeds, one embodiment may check the length of each edge. If an edge is longer than a threshold $l^{long}$, one embodiment may generate an extra seed without a corresponding symbol ID (see FIG. 17e). One embodiment may place the seed at the end of a line segment that bisects the corresponding angle and whose length is the average of two adjacent edges (see FIG. 17e). In one embodiment $l^{long}$ may be defined as 1.5*original_length, where the original_length is the length of the corresponding edge in the overlaid reference ring shape (see FIG. 17a). Other embodiments may use other methods to calculate the threshold $l^{long}$. The system may then check the edge for collisions again. If a collision is detected, one or more objects must be in a triangle constructed by $e^{tar}$, s0 and s1, so the embodiment may construct edges (see FIG. 17f).

Relaxation

Embodiments may place a reference element with its neighbors that have the most similar shape to the target neighbors. However, an error may accumulate in each local growth process because the system may not always find the "just fitting" element that makes the error value zero. One embodiment may provide a relaxation process that modifies the positions of the previously synthesized elements so as to keep the local feature of the synthesized pattern as similar to that of the reference as possible. In one embodiment, for each synthesized element, the system may adjust the ring shape of each synthesized element to that of the corresponding reference element. Note that each synthesized element may have a corresponding reference element that is matched at the local growth process.

Figure 18A:
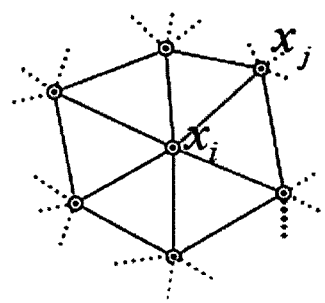
FIGS. 18a through 18c illustrate a relaxation process according to one embodiment.
Figure 18B:
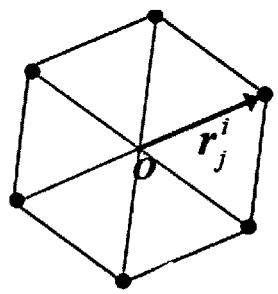
Figure 18C:
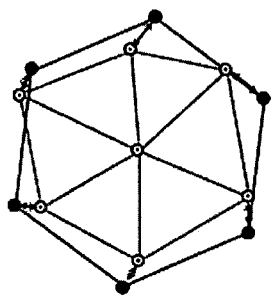

FIGS. 18a through 18c illustrate a relaxation process according to one embodiment. An immediate neighborhood shape of each vertex (FIG. 18a) is fitted to its desired shape (FIG. 18b). A gap between each vertex and its desired position is minimized (FIG. 18c).

Referring to FIGS. 18a through 18c, let $x_i$ be a position of a synthesized element $e_i^{ref}$ and $w(x_i)$ be a set of its neighboring positions. A relative position of the corresponding reference ring shape may be referred to as $r_j^i$, where $r_j^i$ corresponds to $x_j \in w(x_i)$ (see FIGS. 18a and 18b). One embodiment may minimize a distance between each neighbor's positions $x_j$ and the position of the corresponding reference ring shape (see FIG. 18c):

$$\min_x \sum_i \sum_{j \in w(x_i)} \|x_j - (x_i + r_j^i)\|^2 \quad (5)$$

Since this representation is translation invariant, one embodiment may predetermine the position of one element in order to have a unique minimizer. In one embodiment, the initial element may be held at the initial position. If there are user-specified boundaries, one embodiment may constrain elements at their generated position.

$$x_k = x_k^0 \ k \in \text{CONSTRAINTS} \quad (6)$$

This quadratic minimization problem with linear constraints may be solved, for example, by closed form. One embodiment may apply a Lagrange multiplier method. Other embodiments may use other methods. Note that there may be elements that lose an edge or get an extra edge during growth. These elements no longer have the same topology as the corresponding reference element. All seeds also may not yet have a corresponding reference element. For these objects, one embodiment may use their current neighboring shapes as target ring shapes. Other embodiments may use other methods to determine target ring shapes.

Figure 19A:
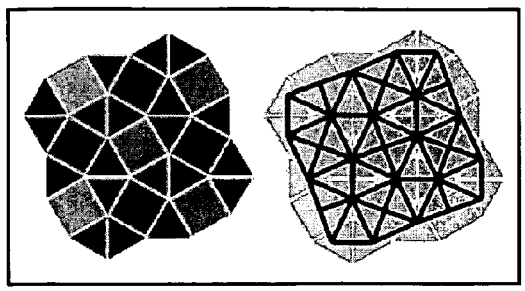
FIGS. 19a through 19f illustrate reference arrangements and constructed connections and synthesized arrangements or patterns according to one embodiment.
Figure 19B:
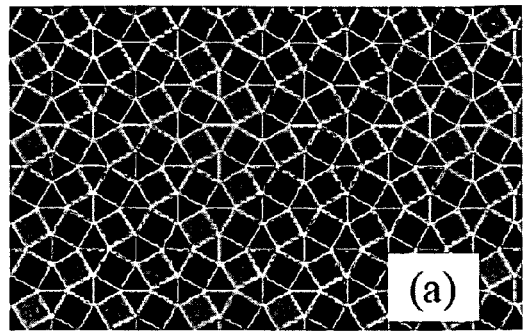
Figure 19C:
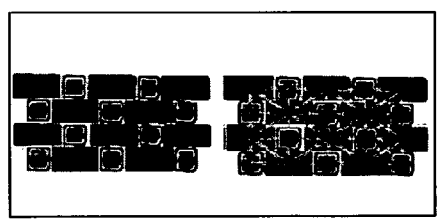
Figure 19D:
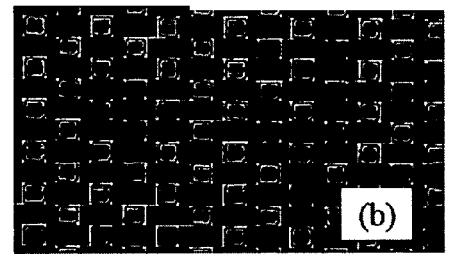
Figure 19E:
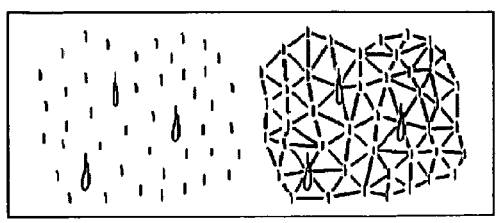
Figure 19F:
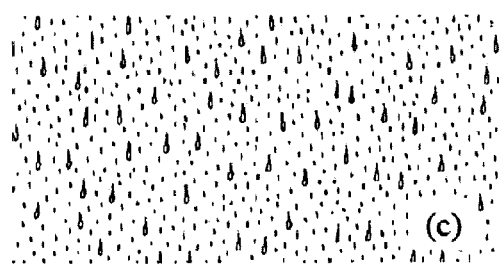

FIGS. 19a through 19f illustrate reference arrangements and constructed connections and synthesized arrangements or patterns according to one embodiment. FIGS. 19a through 19f show synthesized patterns with reference arrangements in three different classes; a regular pattern (FIG. 19a), a near regular pattern (FIG. 19c), and an irregular uniform distribution (FIG. 19f). FIG. 19a shows a regular reference arrangement in which are arranged two different shades of triangles and two different shades of rectangles, and FIG. 19b shows a synthesized pattern from the reference arrangement of FIG. 19a. FIG. 19c shows a near regular reference arrangement in which are arranged short and long blocks, and FIG. 19d shows a synthesized pattern from the reference arrangement of FIG. 19c. Small randomness is introduced to the scale rotation and color of each symbol. FIG. 19e shows a reference arrangement with irregular uniform distribution. FIG. 19f shows a synthesized pattern from the reference arrangement of FIG. 19e. Sketch strokes expressing water drops are arranged in an irregular distribution. Since the system attempts to keep local spatial relationship and topology between neighbors, it can cover these three classes in the same framework.

Figure 20B:
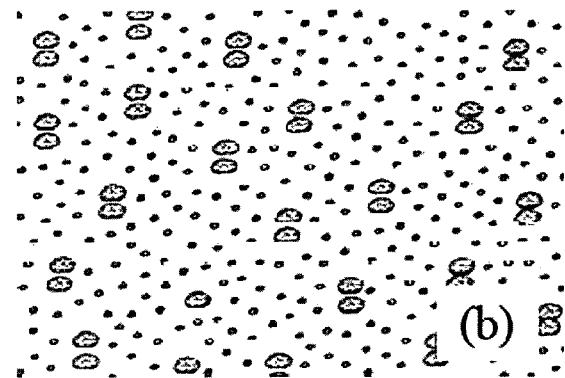
FIGS. 20a through 20c illustrate the effects of rotation modes according to one embodiment.
Figure 20A:
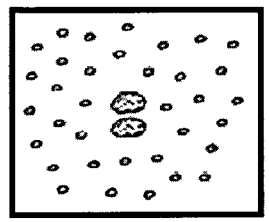
Figure 20C:
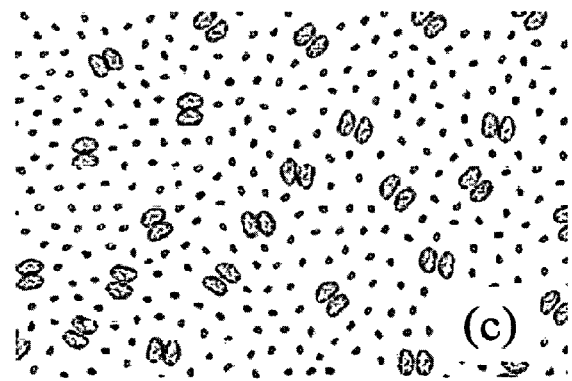
Figure 21A:
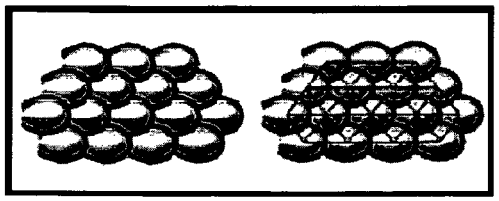
FIGS. 21a through 21d illustrate the effects of various rotation modes according to one embodiment.
Figure 21B:
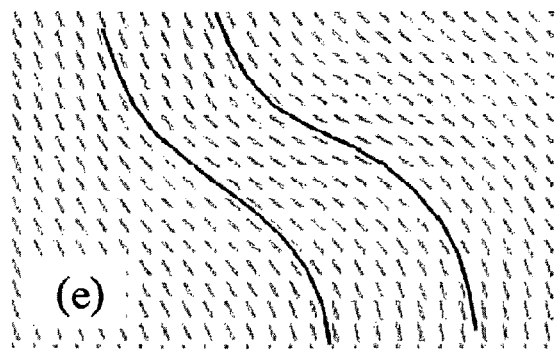
Figure 21C:
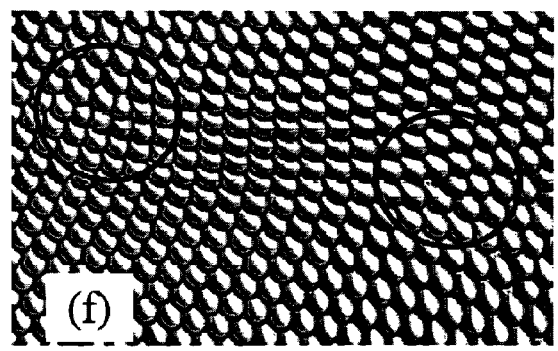
Figure 21D:
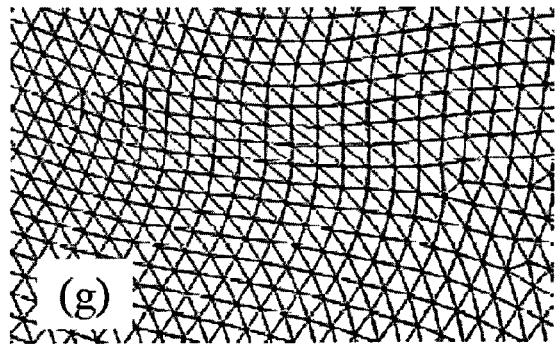

FIGS. 20a through 20c and FIGS. 21a through 21d illustrate the effects of rotation modes according to one embodiment. The system takes same reference arrangement shown in FIG. 20a and generates different result in nonrotation mode (FIG. 20b) and rotation mode (FIG. 20c). In these examples, a higher priority may be assigned to the gray stone. In both cases, two gray stones appear close to each other. While an orientation of each two stones is retained in the non-rotation mode, it is locally rotated in the rotation mode. FIGS. 21a through 21d illustrate the flow field mode according to one embodiment. The user can also control the arrangement patterns by specifying underlying flow fields. In flow field mode, the system takes a user-specified reference (FIG. 21a) and a flow field (FIG. 21b), and synthesizes a pattern (FIG. 21c) along the flow field. In one embodiment, when the user draws strokes by using the flow field tool (curved lines in FIG. 21b), the system generates flow fields along the strokes, as illustrated in FIG. 21b. The system then takes the flow field as well as the reference arrangement in FIG. 21a and synthesizes a new pattern, as illustrated in FIG. 21c, in which scales are aligned along the flow. In one embodiment, the system may change the topology to keep the uniform distribution. The circles in FIG. 21c highlight positions at which the local topology changes. FIG. 21d shows the resulting connectivity.

User Interface

To provide an intuitive synthesis process and to support creative design processes, embodiments may provide one or more types of interaction tools via a user interface for controlling global features of the resulting pattern in response to user input/control. The tools may include one or more of, but are not limited to:

A painting tool, for example a spray tool, that activates seeds under the cursor area. This tool allows the user to paint the arrangement pattern. Embodiments are fast enough to return immediate feedback. "Spray tool" is referred to herein by way of example, and is not intended to be limiting; other types of painting tools, such as brush or bucket tools, that activate seeds under a cursor or other user interface element controlled by the user, or that perform similar "painting tool" functions, may also be provided in embodiments.

A flow field tool that allows the user to design flow fields by drawing a set of strokes. The system may use the directions of the input strokes as constraints and interpolates 2D space, for example using radial basis functions.

A boundary tool that allows the user to draw a set of boundary strokes which stop the local growth.

FIGS. 22a-22b, FIGS. 23a-23b, and FIGS. 24a-24b illustrate exemplary results created using various user interface tools, according to embodiments. One embodiment may provide a flow field tool for specifying an underlying flow field, results of which is illustrated in FIG. 22b. The flow field tool allows the user to design flow fields by drawing a set of strokes. The system uses the directions of the input strokes as constraints, and interpolates 2D space. In FIG. 22b, the orientation of feathers synthesized from a reference arrangement shown in FIG. 22a is controlled using the flow field tool, and the growth area is controlled using the spray tool. The lines with arrows in FIG. 22b represent user input specifying the desired flow field.

One embodiment may provide a boundary tool for limiting growth, as illustrated in FIG. 23b. The boundary tool allows the user to draw a set of boundary strokes that stop the local growth. In FIG. 23b, the growth area of the blocks synthesized from a reference arrangement shown in FIG. 23a is limited by a boundary tool. The solid lines in FIG. 23b represent user input specifying the desired boundaries.

Figure 24A:
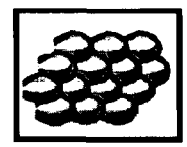

One embodiment may provide a painting tool, for example a spray tool, for specifying the growth area, results of which are illustrated in FIG. 24b. In one embodiment, the spray tool activates the seeds under the cursor area. This tool allows the user to paint by arrangement pattern. Embodiments of the spray tool may return immediate feedback. In FIG. 24b, four characters "Euro" are painted, for example using a spray tool, with scales synthesized from a reference or arrangement pattern shown in FIG. 24a. The underlying flow fields are specified using a flow field tool, and a growth area may be specified using a spray tool.

In the examples shown in FIGS. 22b and 24b, three-dimensional (3D) objects which have a rounded shape and are slightly slanted are arranged by an embodiment so that the results naturally express an overlapping effect. The effects illustrated in these exemplary Figures are difficult to create with a 2D vector based approach because it is required to specify the rendering order of elements explicitly. Some embodiments may provide a global shape optimization of the distribution in synthesis process that may, for example, help to avoid errors in concentrating in a local area and help to obtain smooth results. Embodiments may also provide the ability to modify the local orientation or size of each element after obtaining the arrangement. This type of control is difficult for pixel based texture synthesis.

Figure 25:
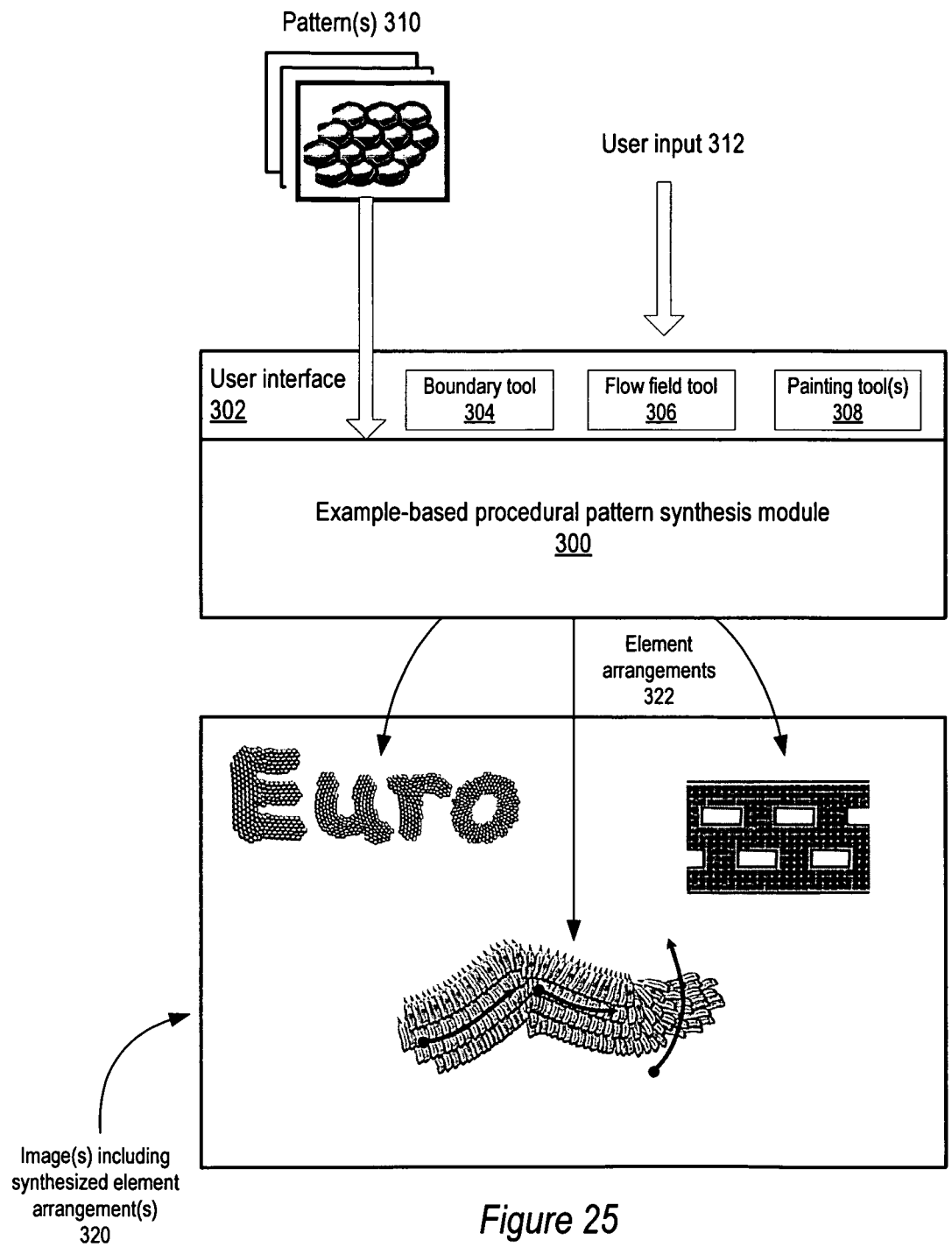
FIG. 25 illustrates an example-based procedural pattern synthesis module according to one embodiment.

FIG. 25 illustrates an example-based procedural pattern synthesis module according to one embodiment. In embodiments, the method and apparatus for synthesizing element arrangements from an example, as described herein, may be implemented as or in a module 300 as illustrated in FIG. 25. Example-based procedural pattern synthesis module 300 may be implemented in a stand-alone application or as a module of a graphics application or graphics library that provides other graphical tools. Examples of graphics applications in which embodiments of module 300 may be implemented include, but are not limited to, painting, publishing, photography, games, animation, and/or other applications. Module 300 may be used in display, rendering, producing and/or storing an image, video, and/or other graphics output.

Module 300 may provide a user interface 302 that includes one or more tools, such as a boundary tool 304, flow field tool 306, and painting tool 308. Module 300 may obtain one or more patterns 310 (reference arrangements) and, from the pattern(s) 310, generate one or more element arrangements 322 in one or more digital images 320 in accordance with user input 312 received via user interface 302. Module 300 may combine a texture synthesis technique based on local neighborhood comparison of an example, which may be referred to as a reference arrangement, and a target with procedural modeling based on local growth, as described herein, in generating element arrangements 322 from the input pattern(s) 310.

Embodiments of an example-based procedural method and apparatus for element arrangement have been described. Embodiments may combine a texture synthesis technique based on local neighborhood comparison of an example (a reference arrangement) and a target with procedural modeling based on local growth. In the example-based procedural method and apparatus, the user does not have to define rules by writing difficult scripts to synthesize element arrangements. Embodiments may provide a controllable synthesis framework for synthesizing element arrangements from examples with user control via a user interface. The user may interactively and dynamically control the synthesis process via one or more provided tools enabled via the user interface to the process.

Exemplary System

Figure 26:
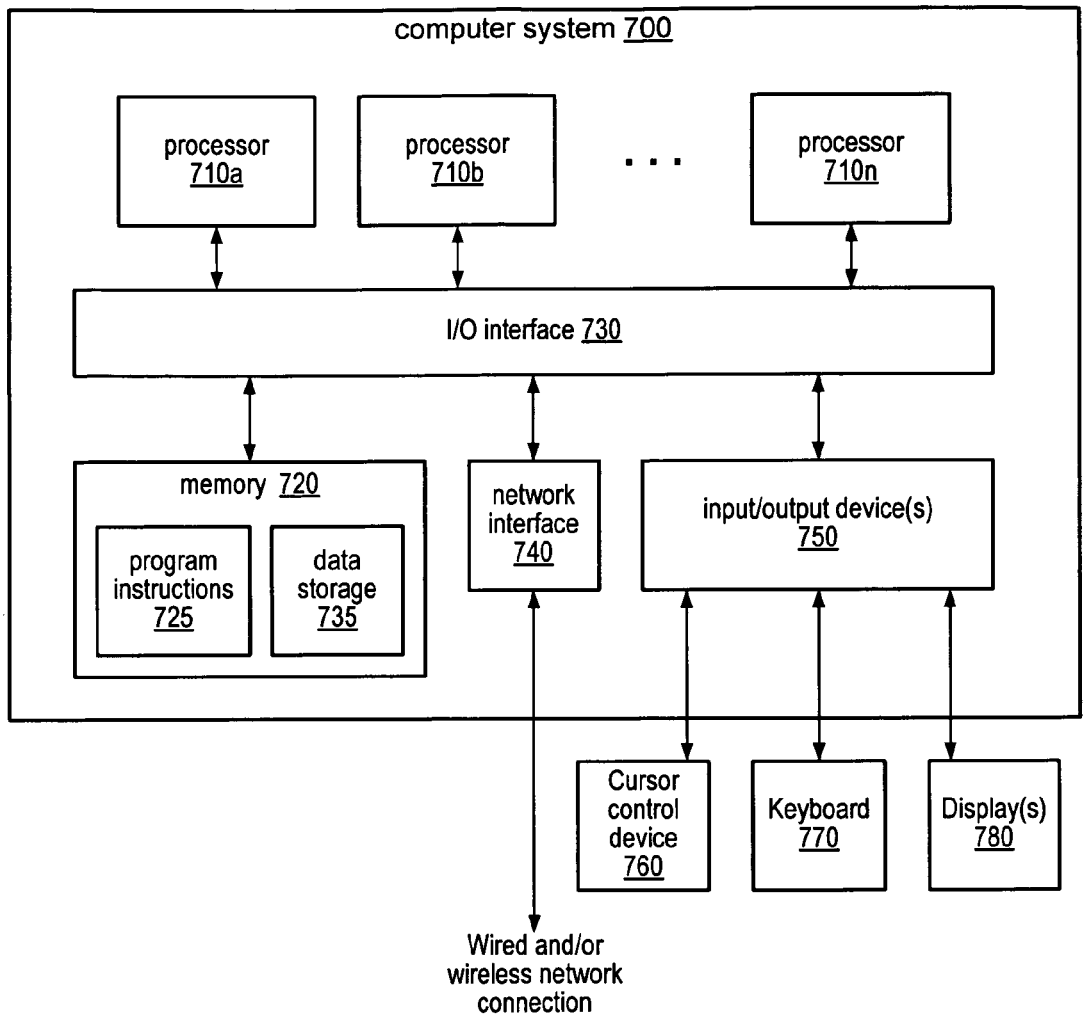
FIG. 26 illustrates an exemplary computer system that may be used in embodiments.

Various components of embodiments of a method and apparatus for synthesizing element arrangements from an example may be executed on one or more computer systems, which may interact with various other devices. One such computer system is illustrated by FIG. 26. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method and apparatus for synthesizing element arrangements from an example, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 26, memory 720 may include program instructions 725, configured to implement embodiments of a method and apparatus for synthesizing element arrangements from an example as described herein, and data storage 735, comprising various data accessible by program instructions 725. In one embodiment, program instructions 725 may include software elements of a method and apparatus for synthesizing element arrangements from an example as illustrated in the above FIGS. 1a through 25. Data storage 735 may include data that may be used in embodiments. In other embodiments, other or different software elements and data may be included.

Program instructions 725 may be configured to implement a method and apparatus for synthesizing element arrangements from an example as a stand-alone application, or as a module of another graphics application or graphics library, in various embodiments. For example, in one embodiment program instructions 725 may be configured to implement one or more graphics applications such as painting, publishing, photography, games, animation, and/or other applications, and may be configured to synthesize element arrangements from an example as described herein as part of one or more of these graphics applications. In another embodiment, program instructions 725 may be configured to implement a method and apparatus for synthesizing element arrangements from an example as described herein in one or more functions called by another graphics application executed on processor(s) 710 or on some other device or system via network interface 740. Program instructions 725 may also be configured to render images and present them on one or more displays 780 as the output of a method and apparatus for synthesizing element arrangements from an example and/or to store rendered image data in memory 720, in various embodiments.

Those skilled in the art will appreciate that computer system 700 is merely illustrative and is not intended to limit the scope of a method and apparatus for synthesizing element arrangements from an example as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for synthesizing a pattern, comprising:
    iteratively placing single elements from a reference arrangement in a synthesized pattern area, wherein the reference arrangement comprises a plurality of spatially arranged reference elements, wherein placing a single element from the reference arrangement in the synthesized pattern area comprises:
        determining a target seed in the synthesized pattern area, wherein the target seed is a location in the synthesized pattern area at which the single element from the reference arrangement is to be placed;
        determining neighborhood features for the target seed in the synthesized pattern area, wherein the neighborhood features for the target seed indicate a local spatial relationship of the target seed with one or more neighboring locations or elements in the synthesized pattern area;
        determining a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area; and
        placing a copy of the determined particular one of the plurality of reference elements at the location of the target seed in the synthesized pattern area as the single element.

2. The method as recited in claim 1, further comprising, prior to said iteratively placing single elements from a reference arrangement in a synthesized pattern area:
    constructing connectivity among the plurality of elements of the reference arrangement; and
    determining neighborhood features of each element in the reference arrangement in accordance with the connectivity of the elements, wherein the neighborhood features for each element in the reference arrangement indicate a local spatial relationship of the respective element with one or more neighboring elements in the reference arrangement.

3. The method as recited in claim 1, wherein said iteratively placing single elements from a reference arrangement in a synthesized pattern area further comprises generating one or more new seeds in the synthesized pattern area in accordance with the location of the target seed and the neighborhood features of the reference element.

4. The method as recited in claim 1, wherein said determining a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area comprises applying a rotation to the neighborhood of the reference element to adjust the local spatial relationship of the reference element to the local spatial relationship of the target seed.

5. The method as recited in claim 1, wherein said iteratively placing single elements from a reference arrangement in a synthesized pattern area further comprises adjusting placement of the copy of the determined particular one of the plurality of reference elements in the synthesized pattern area in accordance with a flow field.

6. The method as recited in claim 5, further comprising receiving user input specifying the flow field.

7. The method as recited in claim 1, wherein the synthesized pattern area includes one or more boundaries, the method further comprising limiting placement of copies of the reference elements from the reference arrangement in the synthesized pattern area in accordance with the one or more boundaries.

8. The method as recited in claim 7, further comprising receiving user input specifying the one or more boundaries.

9. The method as recited in claim 1, wherein said iteratively placing single elements from a reference arrangement in a synthesized pattern area is performed in response to receiving user input via a painting tool provided by a user interface.

10. The method as recited in claim 1, wherein the reference arrangement comprises multiple different types of elements.

11. The method as recited in claim 10, further comprising assigning a symbol identifier to each element of each type in the reference arrangement, wherein a symbol identifier uniquely identifies a respective type of element in the reference arrangement.

12. The method as recited in claim 11, further comprising assigning a sub-identifier to each element in the reference arrangement, wherein a sub-identifier uniquely identifies a respective element in the reference arrangement.

13. The method as recited in claim 12, wherein said iteratively placing single elements from a reference arrangement in a synthesized pattern area further comprises selecting at least some elements from the reference arrangement for placement in the synthesized pattern area in accordance with the symbol identifiers and sub-identifiers assigned to the elements in the reference arrangement.

14. A system, comprising:
at least one processor; and
a memory comprising program instructions, wherein the program instructions are executable by the at least one processor to:
iteratively place single elements from a reference arrangement in a synthesized pattern area, wherein the reference arrangement comprises a plurality of spatially arranged reference elements, wherein, to place a single element in the synthesized pattern area, the program instructions are executable by the at least one processor to:
determine a target seed in the synthesized pattern area, wherein the target seed is a location in the synthesized pattern area at which the single element from the reference arrangement is to be placed;
determine neighborhood features for the target seed in the synthesized pattern area, wherein the neighborhood features for the target seed indicate a local spatial relationship of the target seed with one or more neighboring locations or elements in the synthesized pattern area;
determine a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area; and
place a copy of the determined particular one of the plurality of reference elements at the location of the target seed in the synthesized pattern area as the single element.

15. The system as recited in claim 14, wherein the program instructions are further executable by the at least one processor to, prior to said iteratively placing single elements from a reference arrangement in a synthesized pattern area:
construct connectivity among the plurality of elements of the reference arrangement; and
determine neighborhood features of each element in the reference arrangement in accordance with the connectivity of the elements, wherein the neighborhood features for each element in the reference arrangement indicate a local spatial relationship of the respective element with one or more neighboring elements in the reference arrangement.

16. The system as recited in claim 14, wherein, to iteratively place single elements from a reference arrangement in a synthesized pattern area, the program instructions are executable by the at least one processor to generate one or more new seeds in the synthesized pattern area in accordance with the location of the target seed and the neighborhood features of the reference element.

17. The system as recited in claim 14, wherein, to determine a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area, the program instructions are executable by the at least one processor to apply a rotation to the neighborhood of the reference element to adjust the local spatial relationship of the reference element to the local spatial relationship of the target seed.

18. The system as recited in claim 14, wherein the program instructions are further executable by the at least one processor to:
receive user input specifying a flow field for the synthesized pattern; and
adjust placement of copies of reference elements in the synthesized pattern area in accordance with the flow field.

19. The system as recited in claim 14, wherein the program instructions are further executable by the at least one processor to:
receive user input specifying one or more boundaries for the synthesized pattern; and
limit placement of copies of the reference elements from the reference arrangement in the synthesized pattern area in accordance with the one or more boundaries.

20. The system as recited in claim 14, wherein the program instructions are further executable by the at least one processor to receive user input via a painting tool provided by a user interface, wherein said user input directs the program instructions to iteratively place single elements from the reference arrangement in the synthesized pattern area.

21. The system as recited in claim 14, wherein the reference arrangement comprises multiple different types of elements, wherein the program instructions are further executable by the at least one processor to:
assign a symbol identifier to each element of each type in the reference arrangement, wherein a symbol identifier uniquely identifies a respective type of element in the reference arrangement; and
assign a sub-identifier to each element in the reference arrangement, wherein a sub-identifier uniquely identifies a respective element in the reference arrangement.

22. The system as recited in claim 21, wherein, to iteratively place single elements from a reference arrangement in a synthesized pattern area, the program instructions are executable by the at least one processor to select at least some elements from the reference arrangement for placement in the synthesized pattern area in accordance with the symbol identifiers and sub-identifiers assigned to the elements in the reference arrangement.

23. A non-transitory computer-readable storage medium storing program instructions, wherein the program instructions are computer-executable to implement:
　iteratively placing single elements from a reference arrangement in a synthesized pattern area, wherein the reference arrangement comprises a plurality of spatially arranged reference elements, wherein placing a single element from the reference arrangement in the synthesized pattern area comprises:
　　determining a target seed in the synthesized pattern area, wherein the target seed is a location in the synthesized pattern area at which the single element from the reference arrangement is to be placed;
　　determining neighborhood features for the target seed in the synthesized pattern area, wherein the neighborhood features for the target seed indicate a local spatial relationship of the target seed with one or more neighboring locations or elements in the synthesized pattern area;
　　determining a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area; and
　　placing a copy of the determined particular one of the plurality of reference elements at the location of the target seed in the synthesized pattern area as the single element.

24. The non-transitory computer-readable storage medium as recited in claim 23, wherein the program instructions are further computer-executable to implement, prior to said iteratively placing single elements from a reference arrangement in a synthesized pattern area:
　constructing connectivity among the plurality of elements of the reference arrangement; and
　determining neighborhood features of each element in the reference arrangement in accordance with the connectivity of the elements, wherein the neighborhood features for each element in the reference arrangement indicate a local spatial relationship of the respective element with one or more neighboring elements in the reference arrangement.

25. The non-transitory computer-readable storage medium as recited in claim 23, wherein, in said iteratively placing single elements from a reference arrangement in a synthesized pattern area, the program instructions are computer-executable to implement generating one or more new seeds in the synthesized pattern area in accordance with the location of the target seed and the neighborhood features of the reference element.

26. The non-transitory computer-readable storage medium as recited in claim 23, wherein, in said determining a particular one of the plurality of reference elements in the reference arrangement which has a local spatial relationship with one or more neighboring reference elements in the reference arrangement that is most similar to the local spatial relationship of the target seed with the one or more neighboring locations or elements in the synthesized pattern area, the program instructions are computer-executable to implement applying a rotation to the neighborhood of the reference element to adjust the local spatial relationship of the reference element to the local spatial relationship of the target seed.

27. The non-transitory computer-readable storage medium as recited in claim 23, wherein the program instructions are further computer-executable to implement:
　receiving user input specifying a flow field for the synthesized pattern; and
　in said iteratively placing single elements from the reference arrangement in a synthesized pattern area, adjusting placement of copies of the reference elements in the synthesized pattern area in accordance with the flow field.

28. The non-transitory computer-readable storage medium as recited in claim 23, wherein the program instructions are further computer-executable to implement:
　receiving user input specifying one or more boundaries for the synthesized pattern; and
　in said iteratively placing single elements from the reference arrangement in a synthesized pattern area, limiting placement of copies of the reference elements in the synthesized pattern area in accordance with the one or more boundaries.

29. The non-transitory computer-readable storage medium as recited in claim 23, wherein the program instructions are further computer-executable to implement receiving user input via a painting tool, wherein said iteratively placing single elements from the reference arrangement in a synthesized pattern area is performed in response to receiving said user input via the painting tool.

30. The non-transitory computer-readable storage medium as recited in claim 23, wherein the reference arrangement comprises multiple different types of elements, wherein the program instructions are further computer-executable to implement:
　assigning a symbol identifier to each element of each type in the reference arrangement, wherein a symbol identifier uniquely identifies a respective type of element in the reference arrangement;
　assigning a sub-identifier to each element in the reference arrangement, wherein a sub-identifier uniquely identifies a respective element in the reference arrangement.

31. The non-transitory computer-readable storage medium as recited in claim 30, wherein, in said iteratively placing single elements from the reference arrangement in a synthesized pattern area, the program instructions are computer-executable to implement selecting at least some elements from the reference arrangement for placement in the synthesized pattern area in accordance with the symbol identifiers and the sub-identifiers assigned to the elements in the reference arrangement.

* * * * *

UNITED STATES PATENT AND TRADEMARK OFFICE
CERTIFICATE OF CORRECTION

PATENT NO. : 8,457,405 B2  
APPLICATION NO. : 12/039164  
DATED : June 4, 2013  
INVENTOR(S) : Mech Page 1 of 1

It is certified that error appears in the above-identified patent and that said Letters Patent is hereby corrected as shown below:

On the Title Page Item [57], Line 8, between "...to get" and "information of...", delete "neighborhoods" and insert -- neighborhood --, therefor.

Signed and Sealed this  
Twenty-ninth Day of October, 2013

Teresa Stanek Rea  
*Deputy Director of the United States Patent and Trademark Office*